(12) United States Patent
Austin

(10) Patent No.: US 6,763,395 B1
(45) Date of Patent: Jul. 13, 2004

(54) SYSTEM AND METHOD FOR CONNECTING TO AND VIEWING LIVE DATA USING A STANDARD USER AGENT

(75) Inventor: Paul F. Austin, Austin, TX (US)

(73) Assignee: National Instruments Corporation, Austin, TX (US)

(*) Notice: Subject to any disclaimer, the term of this patent is extended or adjusted under 35 U.S.C. 154(b) by 0 days.

(21) Appl. No.: 09/546,047

(22) Filed: Apr. 10, 2000

Related U.S. Application Data

(63) Continuation-in-part of application No. 09/185,161, filed on Nov. 3, 1998, now Pat. No. 6,370,569.
(60) Provisional application No. 60/149,634, filed on Aug. 17, 1999, and provisional application No. 60/065,557, filed on Nov. 14, 1997.

(51) Int. Cl.[7] .............................................. G06F 15/16
(52) U.S. Cl. ....................... 709/245; 709/227; 345/157
(58) Field of Search ................................ 709/245, 227; 345/157

(56) References Cited

U.S. PATENT DOCUMENTS

| | | | | |
|---|---|---|---|---|
| 5,774,664 A | * | 6/1998 | Hidary et al. ................ | 725/110 |
| 5,774,670 A | * | 6/1998 | Montulli ...................... | 709/227 |
| 5,890,172 A | * | 3/1999 | Borman et al. ............ | 715/501.1 |
| 5,978,817 A | * | 11/1999 | Giannandrea et al. ... | 715/501.1 |
| 6,041,360 A | * | 3/2000 | Himmel et al. ............. | 709/245 |
| 6,061,738 A | * | 5/2000 | Osaku et al. ............... | 709/245 |
| 6,101,510 A | * | 8/2000 | Stone et al. ................ | 715/513 |
| 6,138,150 A | * | 10/2000 | Nichols et al. ............. | 709/219 |
| 6,163,779 A | * | 12/2000 | Mantha et al. ............. | 707/100 |
| 6,175,862 B1 | * | 1/2001 | Chen et al. ................. | 709/218 |
| 6,356,256 B1 | * | 3/2002 | Leftwich ..................... | 345/157 |
| 6,370,569 B1 | * | 4/2002 | Austin ........................ | 709/217 |
| 6,560,557 B1 | * | 5/2003 | Carnahan et al. ........... | 702/122 |

OTHER PUBLICATIONS

National Instruments Instrumentation Reference and Catalogue, 1997, Test and Measurement Industrial Automation, pp 2–91 and 2–92.

\* cited by examiner

Primary Examiner—Krisna Lim
(74) Attorney, Agent, or Firm—Meyertons Hood Kivlin Kowert & Goetzel, P.C.; Jeffrey C. Hood

(57) ABSTRACT

A system and method for viewing live data, such as measurement data from an instrumentation system, using a standard user agent or client, such as a web browser. A uniform resource locator (URL) identifying a data source is provided to the user agent. The URL includes a protocol scheme identifying the protocol to use for connecting to the data source. A protocol plug-in may be installed to enable the user agent to display a default view of a live data source. The protocol plug-in may handle the URL by returning standard HTML code to the user agent, wherein the HTML code refers to a data viewer component. The data viewer component may then connect to the data source identified by the URL and receive and display data. In one embodiment, the plug-in or the data viewer may configure the data source to begin generating the live data. The data source may be idle until the plug-in or the data viewer connects to the data source and optionally configures the data source to start providing data. Upon receiving the data, the data viewer component may display the data in the user agent in various ways, depending on the type of data received. The invention thus enables a user to connect to a wide variety of data sources using standard software, such as web browsers, and see a graphical representation of the data without having to write any program code. The user can connect to a data source and view live data, e.g., data that is generated "live" and which was not previously stored in a memory. Advantageously, users may connect to a data source and view live data from the data source in a manner similar to connecting to a traditional web HTTP server and viewing a web page, but without interacting with an HTTP server at any point.

75 Claims, 17 Drawing Sheets

Data Socket Server Example

URL can also identify where data is read from. In this case from a CWDataServer

URL identifies where data is written. In this case to a CWDataServer

Data Socket Server Example

Many applications can connect to the same source

SYSTEM AND METHOD FOR CONNECTING TO AND VIEWING LIVE DATA USING A STANDARD USER AGENT

PRIORITY CLAIM

This application claims benefit of priority of U.S. provisional application Serial No. 60/149,634 titled "System and Method for Connecting to and Viewing Live Data Using a Standard User Agent" filed Aug. 17, 1999, whose inventor was Paul F. Austin.

This application is a continuation-in-part of U.S. patent application Ser. No. 09/185,161 titled "Data Socket System and Method for Accessing Data Sources Using URLs" filed Nov. 3, 1998, now U.S. Pat. No. 6,370,569 whose inventor was Paul F. Austin, which claims benefit of priority of U.S. application Ser. No. 60/065,557 titled "Data Socket Control" filed Nov. 14, 1997, whose inventor was Paul F. Austin.

FIELD OF THE INVENTION

The present invention relates to the field of data display, and more particularly to connecting to and displaying data from a data source using a standard user agent, such as a web browser.

DESCRIPTION OF THE RELATED ART

With the advent of common Internet standards, such as the HTTP communication protocol, publishing certain types of information, such as HTML pages, has become very easy. Related client software utilizing these Internet standards, such as web browsers, have made it easy for users to connect to and receiving information from certain types of servers, such as HTTP servers.

However, these standards are not ideal for transferring certain types of information, such as live measurement data from an instrumentation data source. For this type of data transfer, other specialized communication protocols are often better suited than the default protocols supported by common browsers.

While it is possible to create custom client and server-side code to handle the transfer and graphical display of live data for each situation, this is certainly not the ideal approach to the problem. It would be better to leverage existing technologies, such as client-side web browsers. User agents such as web browsers often provide a mechanism to extend their supported communication protocols using protocol handler plug-ins. As a solution to the problem of viewing data from a live data source, it would be desirable to provide such code that a user may easily install and use to view a wide variety of types of data from a wide variety of data source types.

SUMMARY OF THE INVENTION

One embodiment of the present invention comprises a system and method for viewing live data, such as measurement data from an instrumentation system, using a standard user agent or client, such as a web browser. A uniform resource locator (URL) identifying a data source is provided to the user agent. For example, a URL identifying a source of live meteorological data may be provided to a web browser, e.g., by typing the URL into an address field or selecting the URL from a list of bookmarks. The URL includes a protocol scheme identifying the protocol to use for connecting to the data source.

Standard user agents typically provide support for default protocol schemes, such as "http://", "ftp://", etc. Many user agents also provide the ability for users to extend the supported protocol schemes via protocol plug-ins. According to one embodiment, a protocol plug-in may be installed to enable the user agent to display a default view of a live data source. For example, the Data Socket Transfer Protocol (DSTP), described below, is a TCP/IP-based protocol optimized for transferring streaming data. A URL may specify the Data Socket Transfer Protocol as the protocol scheme to be used in referencing a data source, e.g., "dstp://cosine.natinst.com/dsdemo/3dsurface1", and a plug-in for handling the Data Socket Transfer Protocol may be installed.

The protocol plug-in may handle the URL by returning standard markup language code, e.g., HTML code, to the user agent, wherein the markup language code refers to a data viewer component, e.g., by including an HTML <OBJECT> tag. For example, the data viewer component may be referenced using a CLASSID attribute identifying its globally unique identifier (GUID). The markup language code may also comprise a parameter tag, e.g., an HTML <PARAM> tag, specifying the URL as a parameter to the data viewer component. The data viewer component may then connect to the data source identified by the URL and receive and display data. In the preferred embodiment, the data viewer component utilizes a control or object enabled to connect to the data source and receive the data. One such control, referred to as a DataSocket control, is described herein.

In one embodiment, the plug-in or the data viewer may configure the data source to begin generating the live data. The data source may be idle until the plug-in or the data viewer connects to the data source and optionally configures the data source to start providing data. For example, the plug-in or the data viewer may load one or more software drivers to initiate the data source. In one embodiment, where the data source is a measurement device, the plug-in or the data viewer configures the measurement device to begin taking measurements from a unit under test, and this acquired measurement data is provided as the live data.

Upon receiving the data, the data viewer component may display the data in the user agent in various ways, depending on the type of data received. For example, the viewer may provide default display mechanisms for a simple waveform, a two-dimensional array, a three-dimensional array, an array of strings, etc. The data received from the data source may also include attributes specifying the preferred display settings that the data viewer should use.

U.S. patent application Ser. No. 09/374,740 discloses a system and method for automatically generating URLs referencing various data sources connected to a computer. For example, URLs referencing connected data sources may be automatically generated and placed into the "Favorites" or "Bookmarks" list of a web browser application. Thus, a user may provide a URL referencing a particular data source to a user agent, without needing to know the appropriate syntax for referencing the data source.

The present invention thus enables a user to connect to a wide variety of data sources using standard software, such as web browsers, and see a graphical representation of the data without having to write any program code. The user can connect to a data source and view live data, e.g., data that is generated "live" and which was not previously stored in a memory. Advantageously, users may connect to a data source and view live data from the data source in a manner similar to connecting to a traditional web HTTP server and viewing a web page, but without interacting with an HTTP server at any point. Also, the data source can make its data available using any of various communication protocols, such as a protocol optimized for the transfer of simple or structured data over a connection for an indefinite period of time.

BRIEF DESCRIPTION OF THE DRAWINGS

A better understanding of the present invention can be obtained when the following detailed description of the preferred embodiment is considered in conjunction with the following drawings, in which:

FIG. 6 illustrates exemplary HTML generated by the protocol handler plug-in;

Figure 1:
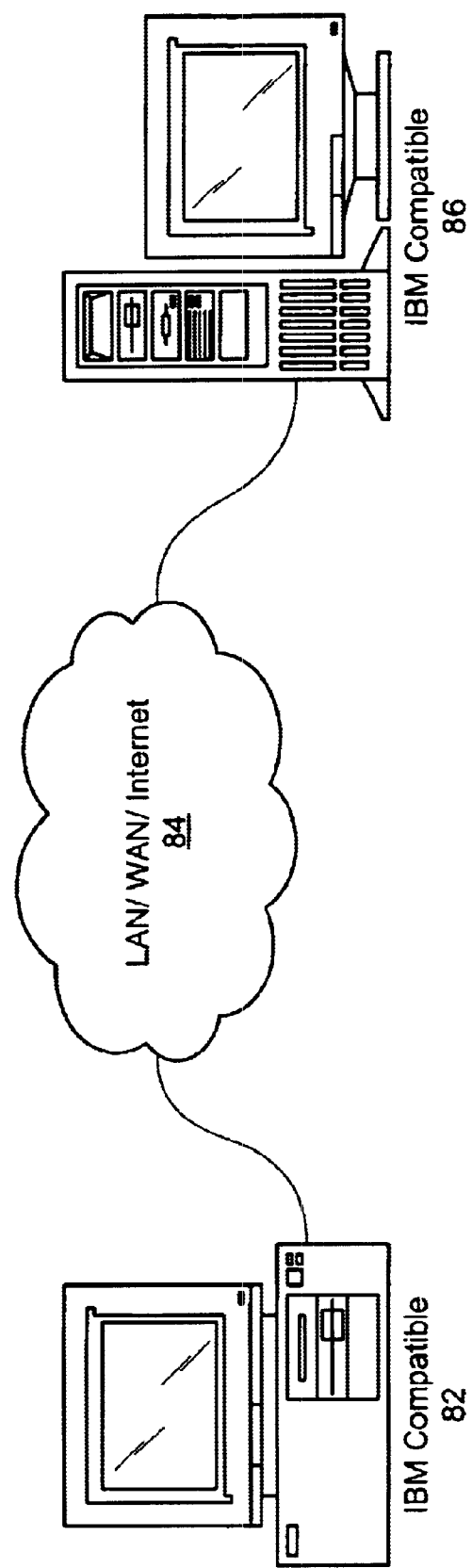
FIG. 1 illustrates a computer system connected through a network to a second computer system.

While the invention is susceptible to various modifications and alternative forms specific embodiments are shown by way of example in the drawings and are herein described in detail. It should be understood however, that drawings and detailed description thereto are not intended to limit the invention to the particular form disclosed. But on the contrary the invention is to cover all modifications, equivalents and alternatives falling within the spirit and scope of the present invention as defined by the appended claims.

DETAILED DESCRIPTION OF THE PREFERRED EMBODIMENT

Incorporation by Reference

The following references are hereby incorporated by reference in their entirety as though fully and completely set forth herein.

U.S. patent application Ser. No. 09/185,161 titled "Data Socket System and Method for Accessing Data Sources Using URLs" filed Nov. 3, 1998, whose inventor was Paul F. Austin.

U.S. patent application Ser. No. 09/374,740 titled "System and Method for Automatically Creating URLs for Accessing Data Sources and Data Targets" filed Aug. 13, 1999, whose inventors were Paul F. Austin, David Fuller, Kurt M. Carlson, Chris Mayer, Stephen Rogers, Joe Savage, and Brian Sierer.

FIG. 1—Computer System Connected to a Network

FIG. 1 illustrates an exemplary computer network in which a computer system 82 is connected through a network 84 to a second computer system 86. The computer system 82 and the second computer system 86 can be any of various types, as desired. The network 84 can also be any of various types, including a LAN (local area network), WAN (wide area network), an Intranet, or the Internet, among others.

The computer system 82 includes or stores a user agent enabled to process markup language code, such as HTML code, XML-derived markup language code, or other markup language code. In the preferred embodiment, the HTML markup language is used, and the following sections are described in terms of HTML. It is noted however, that in various embodiments, the system and method described herein may utilize any of various markup languages.

The user agent may be any of various programs for obtaining data, such as streaming data or files (text, audio, video or other files) from a computer system, e.g., systems coupled to a network. In the preferred embodiment, the user agent is a web browser or an application including web-browsing functionality. The user agent may be used for connecting to various types of servers such as HTTP or FTP servers. The computer system 82 may also include or store a protocol plug-in and a viewer component enabling the user agent to handle URLs which reference sources of live data. The computer system 82 may include multiple protocol plug-ins and viewer components for handling different types of data sources.

As used herein, the term "live data" is intended to include data that is generated "live", "on the fly", or "real time", e.g., data that has not been previously stored in a memory, but is acquired or generated at substantially the same time or within a predetermined time frame of when the data is provided by the data source. It is noted that "live data" may include data that is buffered by the data source to ensure continuity of the data, such as in the case of multimedia data (audio and/or video data). One example of live data is measurement data that is acquired by a measurement device measuring a unit under test (UUT). For example, the measurement device may measure or acquire data from the UUT, and provide this data as live data. Other examples of live data include image or video data acquired "live" by a camera, and audio data acquired "live" by a microphone.

The protocol plug-in and viewer component may be used to connect to and view data from any of various types of data sources. For example, the data source URLs may reference data stored in or generated by peripheral devices connected to the computer system 82, such as peripheral devices connected to the computer's serial port, e.g., the RS-232 port, RS-485 port, a USB (Universal Serial Bus) port, an IEEE 1394 port, an IEEE 1394.2 port, etc., or peripheral devices connected to the parallel port of the computer system 82. The data source URLs may also reference data stored in or generated by peripheral devices connected to a bus of the computer system 82, such as the PCI (Peripheral Component Interconnect) bus, the ISA (Industry Standard Architecture) bus, and the NuBus, among others. Examples of these peripheral devices include instrumentation devices, e.g., data acquisition (DAQ), GPIB, VXI, and PXI devices, industrial automation devices, process control devices, multimedia devices, e.g., video and/or audio devices, network adapters, etc. The data source URLs may also reference external peripheral devices such as a keyboard, mouse, display device, printer, etc. The data source URLs may also reference data sources connected to the computer system 82 through the network 84, such as computer system 86 or addressable data sources of peripheral devices connected to computer system 86. The URLs may also reference data from any other type of data source, such as files, media servers, data socket servers, or other data sources.

The computer system 82 preferably includes a memory medium on which computer programs according to the present invention may be stored, as noted above. The computer programs which may be stored on the memory medium include a user agent, e.g., a web browser, a data viewer, and a protocol handler plug-in, among others.

The term "memory medium" is intended to include various types of memory or storage, including an installation medium, e.g., a CD-ROM, or floppy disks 104, a computer system memory or random access memory such as DRAM, SRAM, EDO RAM, Rambus RAM, etc., or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution. Also, the computer system 102 may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

The memory medium preferably stores a software program for accessing and viewing data, such as live data, from a data source. The software program may be implemented in any of various ways, including procedure-based techniques, component-based techniques, and/or object-oriented techniques, among others. For example, the software program may be implemented using ActiveX controls, C++ objects, Java objects, Microsoft Foundation Classes (MFC), or other technologies or methodologies, as desired. A CPU, such as the host CPU, executing code and data from the memory medium comprises a means for connecting to data sources, retrieving data from the data sources, and displaying the data in a user agent, such as a web browser, according to the steps described below.

Various embodiments further include receiving or storing instructions and/or data implemented in accordance with the foregoing description upon a carrier medium. Suitable carrier media include memory media or storage media such as magnetic or optical media, e.g., disk or CD-ROM, as well as signals such as electrical, electromagnetic, or digital signals, conveyed via a communication medium such as networks and/or a wireless link.

Figure 2A:
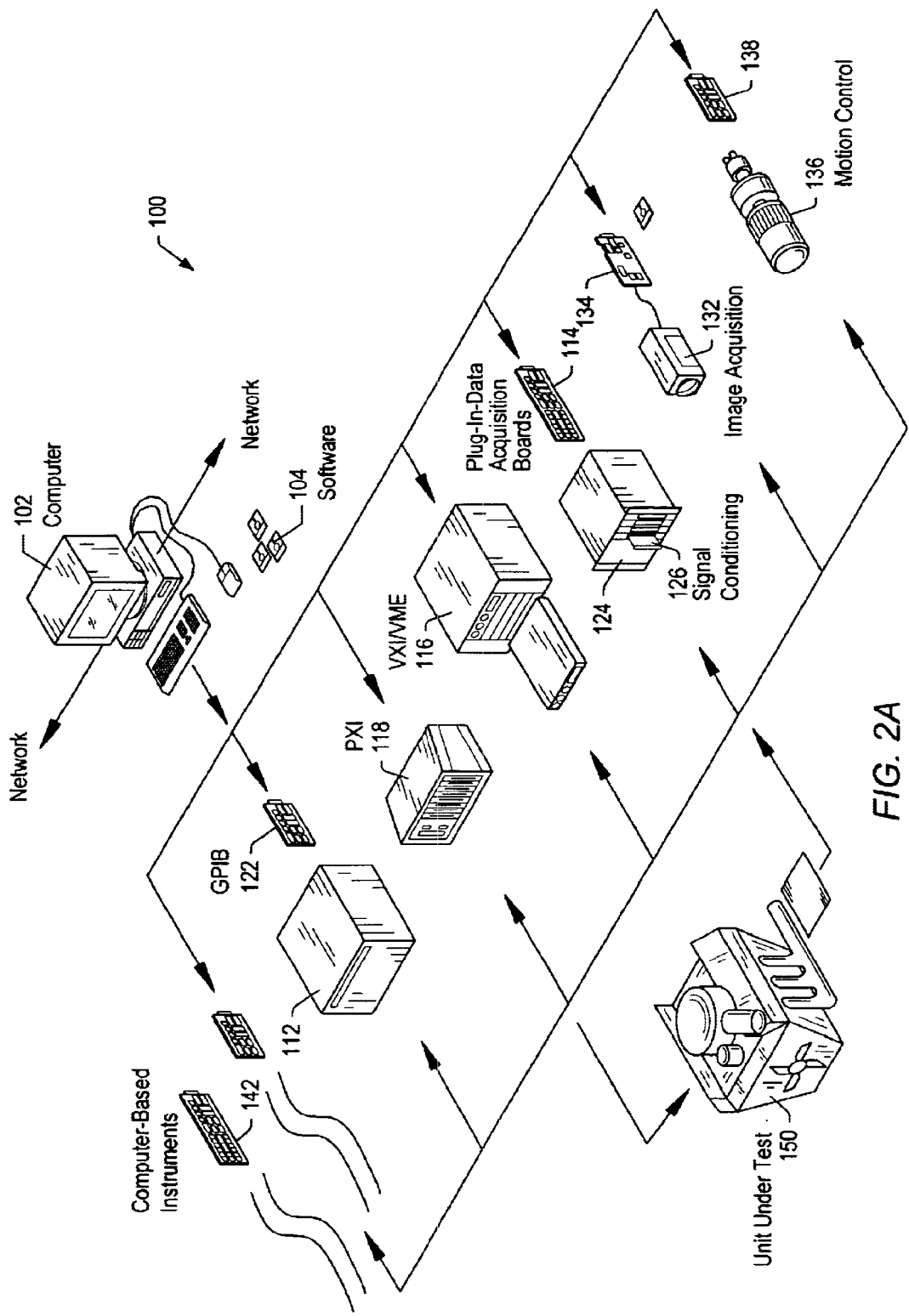
FIGS. 2A and 2B illustrate representative instrumentation and process control systems including various I/O interface options.
Figure 2B:
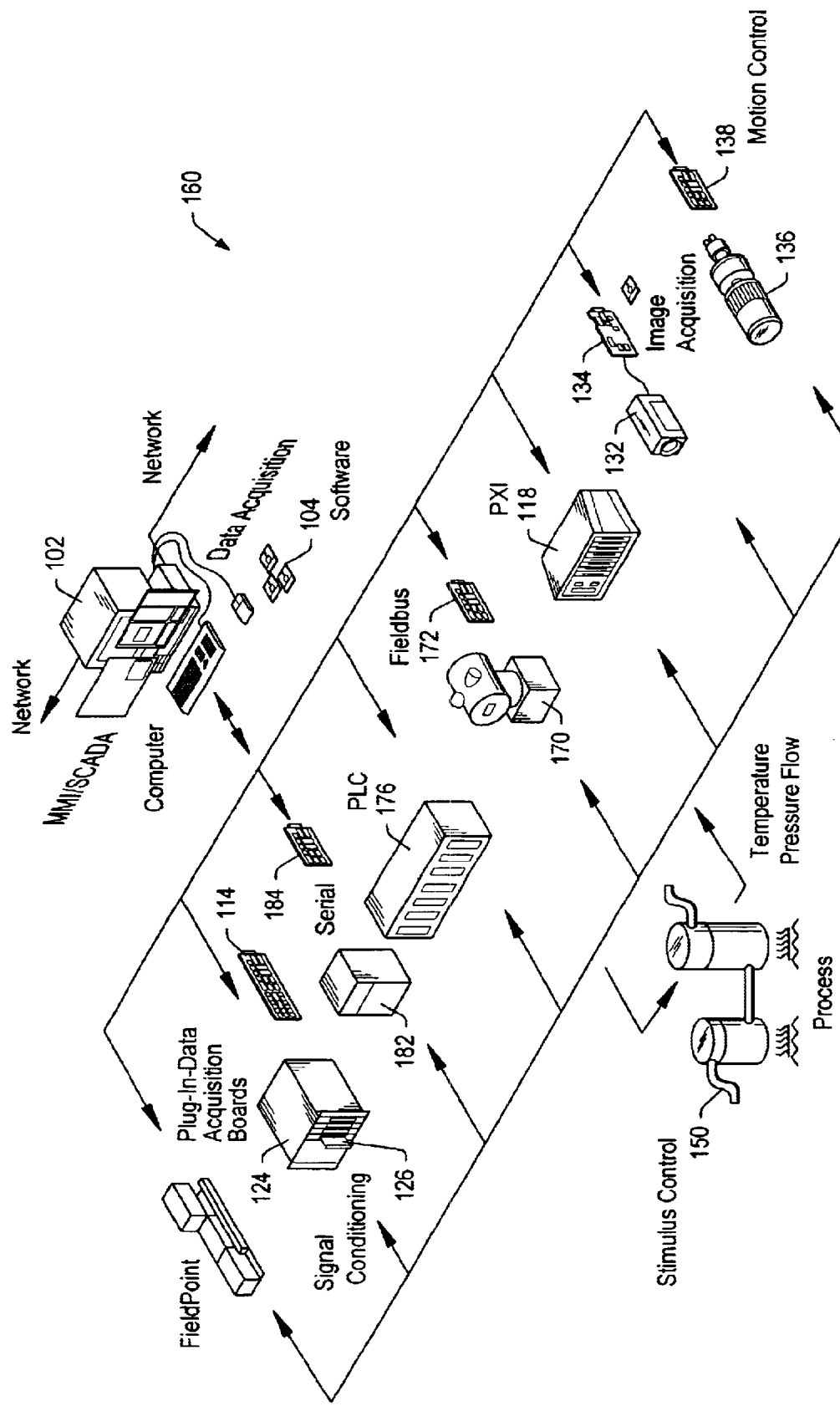

FIGS. 2A and 2B—Instrumentation and Industrial Automation Systems

FIGS. 2A and 2B illustrate exemplary systems that may provide data to be viewed in a standard user agent, such as a web browser, using the present system and method. The present system and method may, of course, also be applied for viewing data from other types of systems or data sources.

FIG. 2A illustrates an instrumentation control system 100. The system 100 comprises a host computer 102 which connects to one or more instruments. The host computer 102 comprises a CPU, a display screen, memory, and one or more input devices such as a mouse or keyboard as shown. The computer 102 connects through the one or more instruments to analyze, measure or control a unit under test (UUT) or process 150. The host computer 102 may store computer programs according to the present invention for viewing data stored in or generated by any of the instruments. These programs may also be stored on another computer connected to the host computer 102 and may be used for viewing this data.

The one or more instruments may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 is coupled to the computer 102 via the GPIB interface card 122 provided by the computer 102. In a similar manner, the video device 132 is coupled to the computer 102 via the image acquisition card 134, and the motion control device 136 is coupled to the computer 102 through the motion control interface card 138. The data acquisition board 114 is coupled to the computer 102, and may interface through signal conditioning circuitry 124 to the UUT. The signal conditioning circuitry 124 preferably comprises an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes.

The VXI chassis or instrument 116 is coupled to the computer 102 via a VXI bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical instrumentation control systems an instrument will not be present of each interface type, and in fact many systems may only have one or more instruments of a single interface type, such as only GPIB instruments.

The instruments are coupled to the unit under test (UUT) or process 150, or are coupled to receive field signals, typically generated by transducers. The system 100 may be used in a data acquisition and control application, in a test and measurement application, a process control application, or a man-machine interface application.

FIG. 2B illustrates an exemplary industrial automation system 160. The industrial automation system 160 is similar to the instrumentation or test and measurement system 100 shown in FIG. 2A. Elements which are similar or identical to elements in FIG. 2A have the same reference numerals for convenience. The system 160 comprises a computer 102 which connects to one or more devices or instruments. The computer 102 comprises a CPU, a display screen, memory, and one or more input devices such as a mouse or keyboard as shown. The computer 102 connects through the one or more devices to a process or device 150 to perform an automation function, such as MMI (Man Machine Interface), SCADA (Supervisory Control and Data Acquisition), portable or distributed data acquisition, process control, advanced analysis, or other control. In FIG. 2B, the computer 102 may also store computer programs according to the present invention for viewing data stored in or generated by any of the devices. These programs may also be stored on another computer connected to the host computer 102 and may be used for viewing this data.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 136 are preferably connected to the computer 102 as described above. The serial instrument 182 is coupled to the computer 102 through a serial interface card 184, or through a serial port, such as an RS-232 port, provided by the computer 102. The PLC 176 couples to the computer 102 through a serial port, Ethernet port, or a proprietary interface. The fieldbus interface card 172 is preferably comprised in the computer 102 and interfaces through a fieldbus network to one or more fieldbus devices. Each of the DAQ card 114, the serial card 184, the fieldbus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

In the preferred embodiment, the data sources from which data is received and displayed using the present system and method are associated with data acquisition/generation, analysis, and/or display, and for controlling or modeling instrumentation or industrial automation hardware. However, it is noted that the present invention can be used for a plethora of applications and is not limited to instrumentation or industrial automation applications. In other words, FIGS. 2A and 2B are exemplary only, and the present invention may be used in any of various types of systems. Thus, the system and method of the present invention may be applied to any of various types of applications, including video data, audio data, meteorological data, and other types of data or "live" data.

Figure 3:
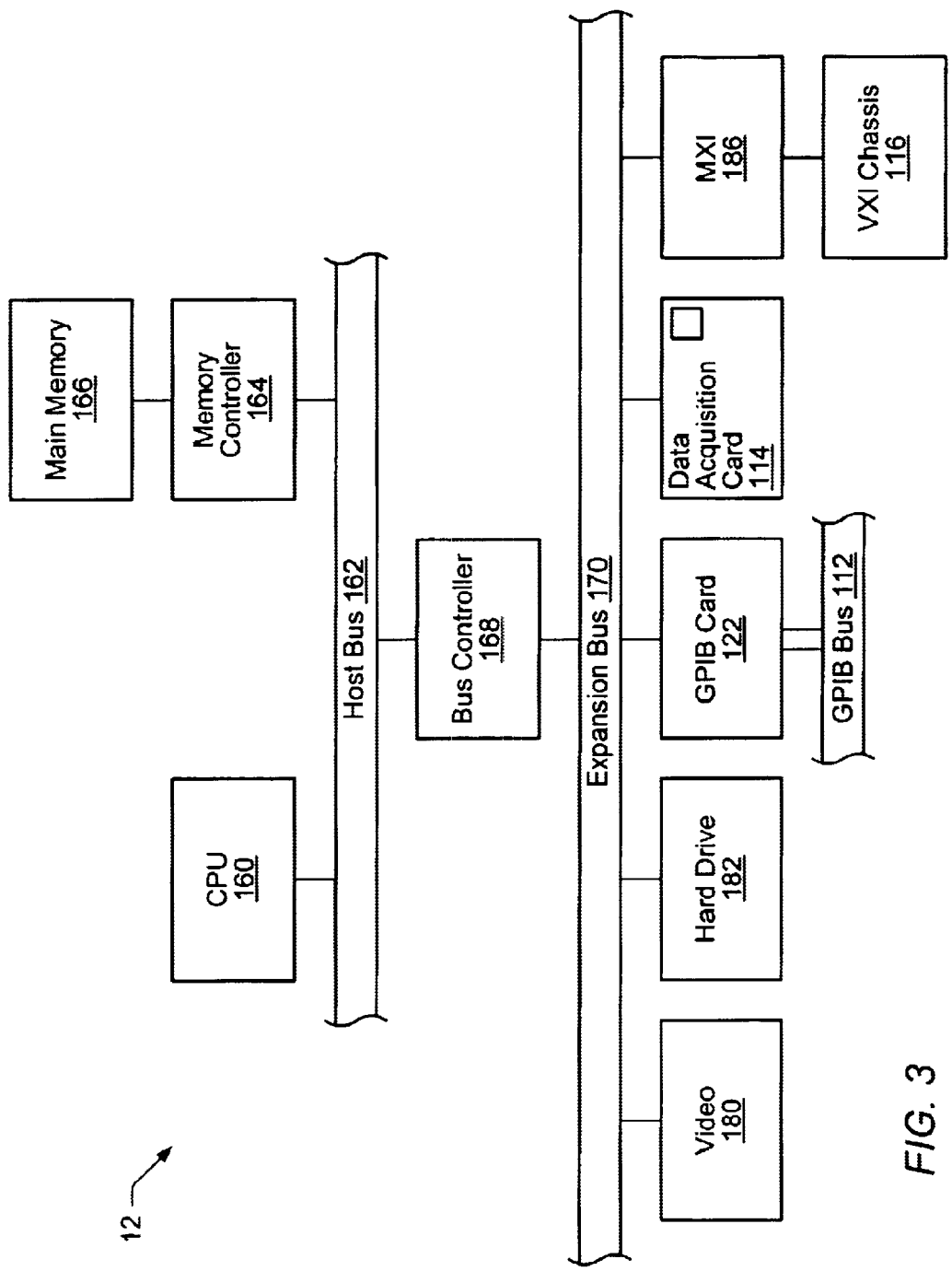
FIG. 3 is a block diagram of the computer system of FIGS. 1, 2A and 2B.

FIG. 3—Computer System Block Diagram

FIG. 3 is a block diagram of the computer systems illustrated in FIGS. 1, 2A and 2B. It is noted that any type of computer system configuration or architecture can be used as desired, and FIG. 3 illustrates a representative PC embodiment. It is also noted that the computer system may be a general purpose computer system as shown in FIGS. 2A and 2B, a computer implemented on a VXI card installed in a VXI chassis, a computer implemented on a PXI card installed in a PXI chassis, or other types of embodiments. The elements of a computer not necessary to understand the operation of the present invention have been omitted for simplicity.

The computer 102 includes at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 stores computer programs according to the present invention. The main memory 166 also stores operating system software as well as the software for operation of the computer system, as well known to those skilled in the art. The computer programs of the present invention will be discussed in more detail below.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 2A), a GPIB interface card 122 which provides a GPIB bus interface to the GPIB instrument 112 (of FIG. 2A), and a VXI or MXI bus card 186 coupled to the VXI chassis 116 for receiving VXI instruments. The computer 102 further comprises a video display subsystem 180 and hard drive 182 coupled to the expansion bus 170.

FIGS. 4–7: Connecting to a Data Source from a User Agent

Figure 4:
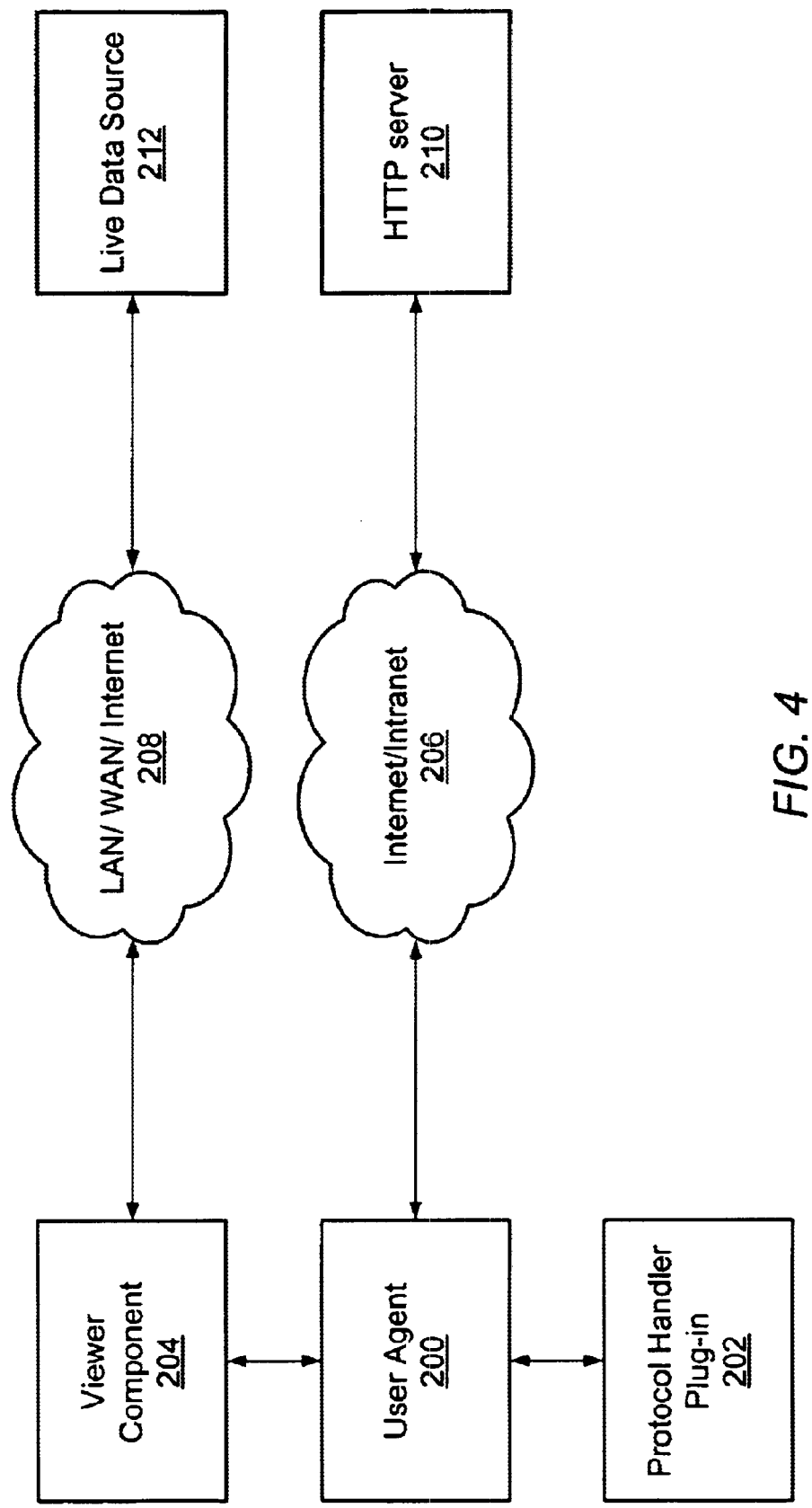
FIG. 4 is a block diagram illustrating the relationship of portions of the computer programs of the present invention.
Figure 5:
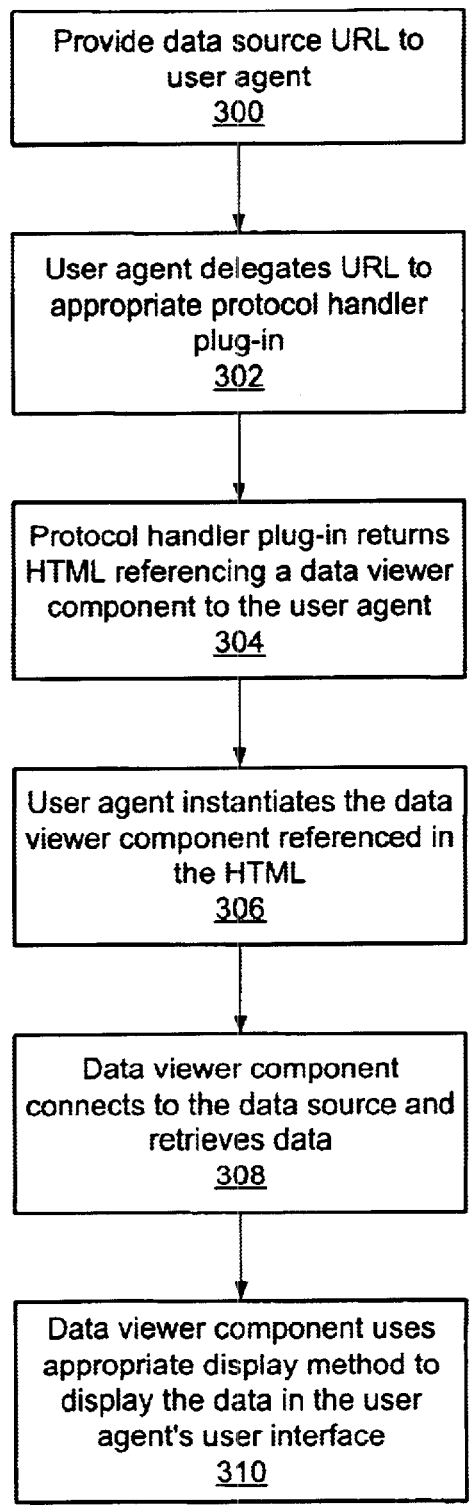
FIG. 5 is a flowchart diagram illustrating the process of connecting to and viewing data from a data source.

FIG. 4 is a block diagram illustrating the relationship of the protocol plug-in 202 and viewer component 204 to the user agent 200. FIG. 5 is a flowchart diagram illustrating the process of connecting to and viewing data from a data source. The user agent 200 is an application for connecting to resources identified by uniform resource locators (URLs). The user agent 200 is preferably a standard web browser or an application with web-browsing capabilities, which is enabled to process markup language code, such as HTML code. The user agent 200 may support certain standard default communication protocols, such as HTTP, HTTPS, FTP, etc. For example, as shown in FIG. 4, the user agent 200 may communicate with a server, such as an HTTP server 210, via a network 206, such as the Internet or an Intranet.

The communication protocols supported by the user agent 200 may be extended by installing protocol plug-ins for the user agent to interface with. For example, in one embodiment, a protocol plug-in 202 may be constructed according to Microsoft's Asynchronous Pluggable Protocols specification, so that a user agent that utilizes the Urlmon.dll dynamic link library (DLL), e.g. Microsoft Internet Explorer, is enabled to delegate URLs with an unrecognized protocol scheme to the plug-in 202. For example, a plug-in 202 supporting a protocol referred to as the Data Socket Transfer Protocol may be registered so that any URL with a protocol scheme of "dstp://" is delegated to the plug-in 202 for handling. The plug-in 202 is constructed and registered as appropriate for a particular user agent 200 or a particular computing platform. Alternatively, the Data Socket Transfer Protocol may be incorporated as a default protocol scheme in the user agent or web browser.

In step 300 of FIG. 5, a URL identifying a data source is provided to the user agent 200. The term "URL" may refer to a uniform resource locator or other mechanism for accessing or referencing a data source, or for referencing both a data source and protocol scheme to be used in accessing the data source. The data source URL may be provided to the user agent in any of various ways. For example, a user may type the URL into an address field, a user may select the URL from a list of bookmarked URLs, a user may drag and drop an icon representing the URL into the user agent, the user agent may be invoked with the URL as a parameter, etc. Where the data source is a measurement device, the URL may reference a channel of a data acquisition device, or the URL may reference a signal to be acquired by the measurement device.

In step 302, the user agent 200 may delegate handling of the URL provided in step 300 to an appropriate protocol handler plug-in 202 registered to handle the protocol scheme specified by the URL. The implementation of step 302 may be specific to a particular type of user agent or protocol plug-in. For example, if the user agent is the Microsoft Internet Explorer web browser, the URL may be delegated to the protocol plug-in by the Urlmon.dll calling a "ParseUrl" method implemented by the plug-in. Alternatively, as noted above, the user agent 200 may be inherently capable of handling the protocol scheme. The following description presumes that plug-in 202 is used to handle the protocol scheme.

In step 304, the plug-in 202 may determine an appropriate viewer component 204 enabled to use the protocol scheme specified in the URL for connecting to the data source identified by the URL and receiving data from this data source. The plug-in 202 may then generate markup language code, e.g. HTML code, which, when processed, will cause the viewer component 204 to be instantiated. This generated HTML code is returned to the user agent 200. The mechanism for returning the HTML code to the user agent 200 may be implementation-specific. As mentioned above, in one embodiment the plug-in 202 is constructed according to Microsoft's Asynchronous Pluggable Protocols specification. For information on the interface between an Asynchronous Pluggable Protocol plug-in and a user agent, please refer to the referenced specification. Exemplary source code for a plug-in of this type is included in Appendix A.

Figure 6:
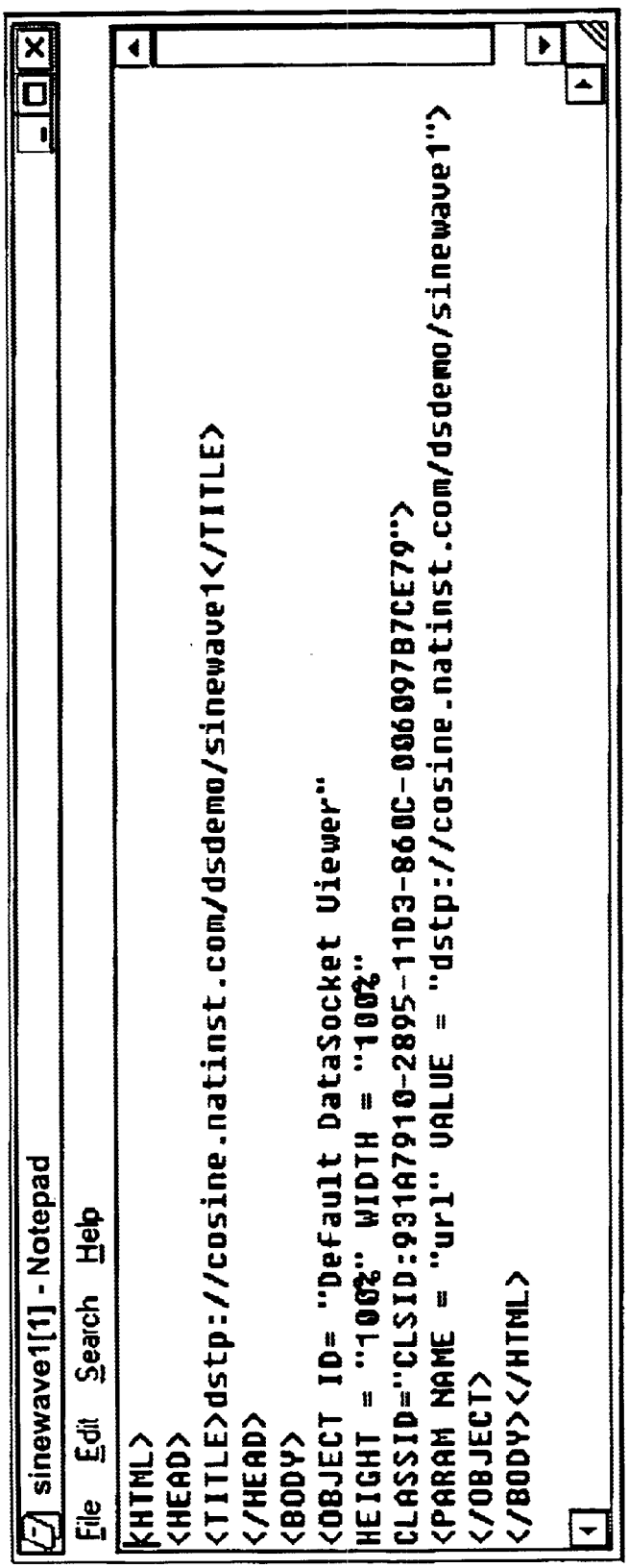

In the preferred embodiment, standard HTML is generated and returned to the user agent 200 in step 304. Such standard HTML may require no extension or modification to the standard HTML specification or the user agent 200. In one embodiment, the HTML returned to the user agent is similar to the HTML code illustrated in FIG. 6. The exemplary HTML of FIG. 6 references a data viewer component 204 by its globally unique identifier (GUID). For example, the GUID may identify an ActiveX component. In other embodiments, the data viewer component 204 may be implemented and/or referenced differently. For example, the data viewer component 204 may be a Java applet referenced by a URL. As shown in FIG. 6, the HTML code also specifies the URL delegated to the plug-in in step 302 as a parameter to the data viewer component 204.

In step 306, the user agent 200 receives and processes the HTML received from the plug-in 202. As a part of this processing, the user agent 200 instantiates the data viewer component 204 referenced in the HTML. For example, the data viewer component 204 may be instantiated as an ActiveX control embedded in the user agent 200, or as a Java applet, etc. Thus, the data viewer component 204 may display data directly in the user interface of the user agent. The data viewer component 204 may also provide the ability for the user to interactively change various display settings.

In step 308, the data viewer component 204 connects to the data source identified by the URL and retrieves data from the data source. As illustrated in FIG. 4, the viewer component 204 may connect to a data source 212 via a network 208 such as a LAN, WAN, the Internet, etc. The viewer component 204 may also connect to a data source 212 which is included in the same computer system that is running the user agent or is attached to the computer system via a mechanism other than a network, e.g. an attached instrument or device as described with reference to FIG. 2. In the preferred embodiment, the data viewer may connect or couple to the data source without connecting to a web server and without utilizing any web server protocols.

In one embodiment, the viewer component 204 utilizes an embedded component or control, such as the DataSocket control disclosed in U.S. patent application Ser. No. 09/185,161, for connecting to the data source 212 and receiving data from the data source 212. As described in more detail below, the DataSocket control passes the data received from the data source 212 to the data viewer component 204.

In step 308, the plug-in 202 or the data viewer 204 may operate to configure the data source to begin producing data, e.g., to begin producing the live data, after connecting to the data source. In one embodiment, the plug-in 202 or the data viewer 204 configures the data source by loading one or more software drivers to initiate the data source, or creating or invoking drivers or other software to initiate the data source. Thus, in one embodiment, the data source may be idle, not producing any data, until the plug-in 202 or data viewer 204 connects to the data source and initiates the data source. As one example, where the data source is a measurement device, the plug-in 202 or data viewer 204 may configure the measurement device to begin measuring a unit under test (UUT) or process, or acquiring data from the UUT or process, wherein the measurement device then generates the measurement data in response.

In step 310, the data viewer 204 parses the data and displays the data in any of various ways. The data viewer preferably receives the data in a self-describing format, such as the format utilized in the above-referenced DataSocket system. The data viewer may examine the received data, determine a display method based on the received data, and then display the received data using the determined display method. Thus the data viewer may present the data graphically, using a method appropriate to the format of the data received. For example, if the data comprises a waveform, the data may be displayed on a graph; if the data comprises a matrix, the data may be displayed on a three-dimensional graph; if the data comprises text, the data may be displayed in a text box, etc. The data may also comprise attributes indicating the preferred settings for the data viewer. The data viewer may be operable to interpret these attributes, or the attributes may be ignored or unsupported. Rather than passing these display option settings directly with the data, the data may comprise a URL which points to the location of the preferred display options. In this case, the data viewer is preferably configured to connect to the resource identified by the URL and read the display options. As described below, the DataSocket system includes the ability to pass attributes such as these along with data.

In an alternative embodiment, the data viewer may not receive the data in a self-describing format, but may rather receive "raw" data according to a particular format. The data viewer may be operable to use a default display method to display the data, without analyzing the data to determine an appropriate display method.

The data source 212 may be a live data source which streams data to the viewer component 204 so that the display of the data changes dynamically. Thus, the retrieval of data in step 308 and the display of the data in step 310 may be an iterative or continuous process. For example, a data viewer utilizing a DataSocket control may be notified by the DataSocket control each time a new packet of data is received, and the data viewer may then display the data. Exemplary source code for a data viewer component utilizing a DataSocket control is included in Appendix B.

Figure 7A:
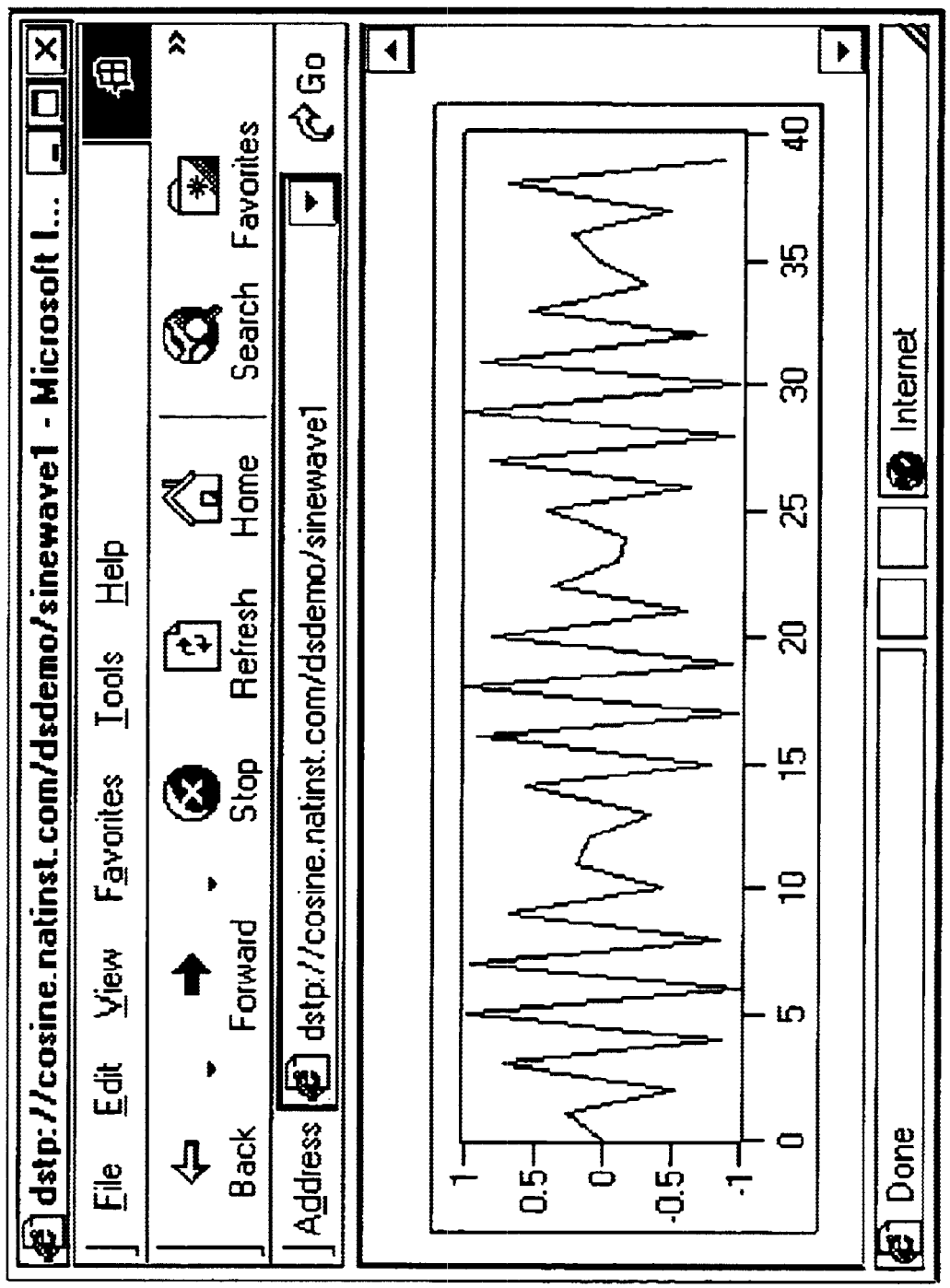
FIGS. 7A and 7B illustrate snapshots of different types of live data retrieved and displayed in a web browser.
Figure 7B:
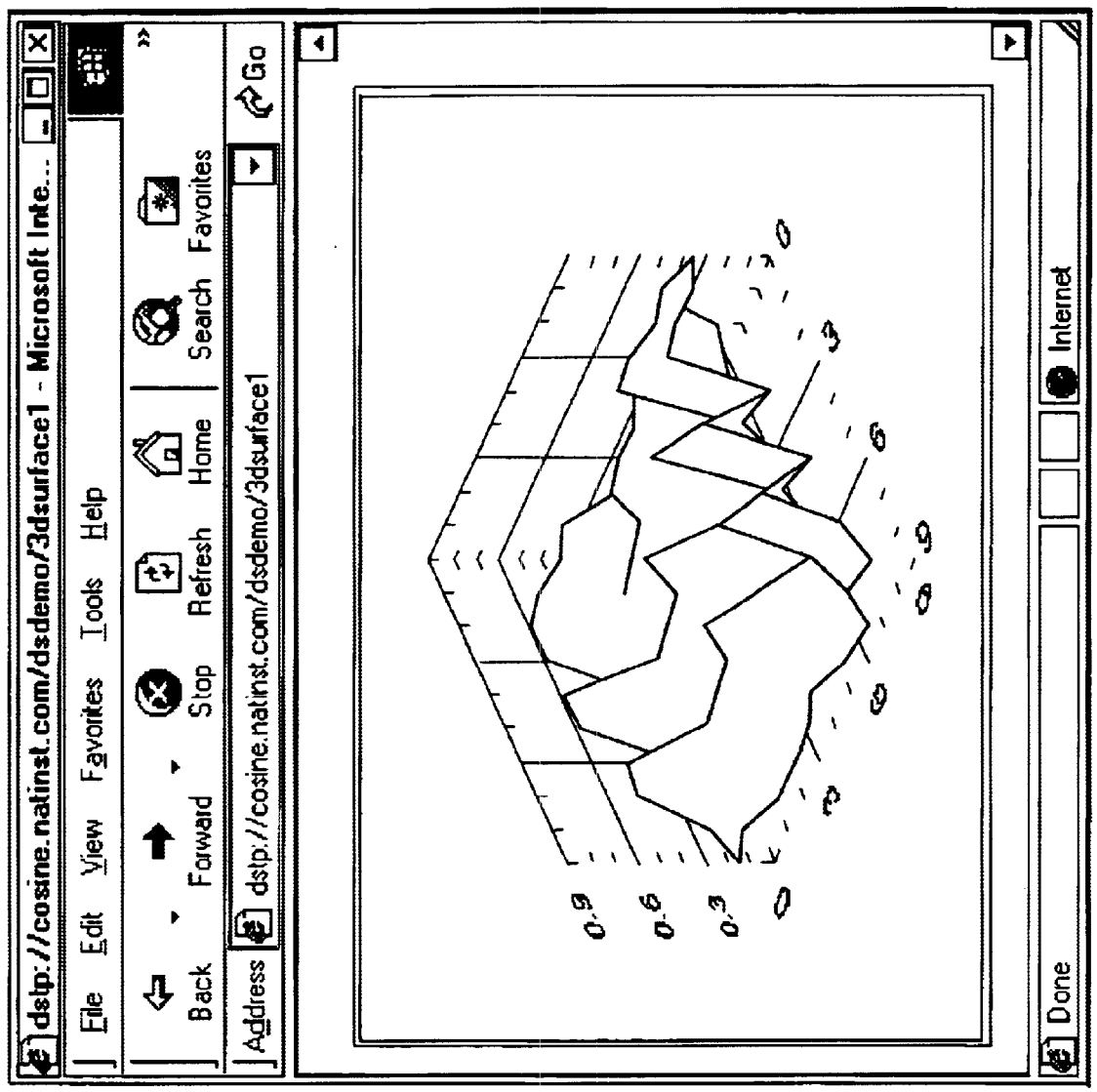

FIG. 7 illustrates snapshots of different types of live data retrieved and displayed using the system and method described above. FIG. 7A illustrates the display of waveform data in a graph. FIG. 7B illustrates the display of matrix data in a three-dimensional graph. In the FIG. 7 example, the user agent 200 is the Microsoft Internet Explorer web browser, the protocol handler plug-in 202 is the protocol handler plug-in disclosed in appendix A, and the data viewer component 204 is the data viewer disclosed in appendix B. In this example, the data viewer component utilizes a DataSocket control enabled to use a communication protocol referred to as the Data Socket Transfer Protocol (DSTP) to connect to DataSocket server resources identified by the URLs:

dstp://cosine.natinst.com/dsdemo/sinewave1; and dstp://cosine.natinst.com/dsdemo/3dsurface1 for FIG. 7A and FIG. 7B, respectively. The DataSocket control, DataSocket server, and the DSTP protocol are described in more detail below.

Figure 8:
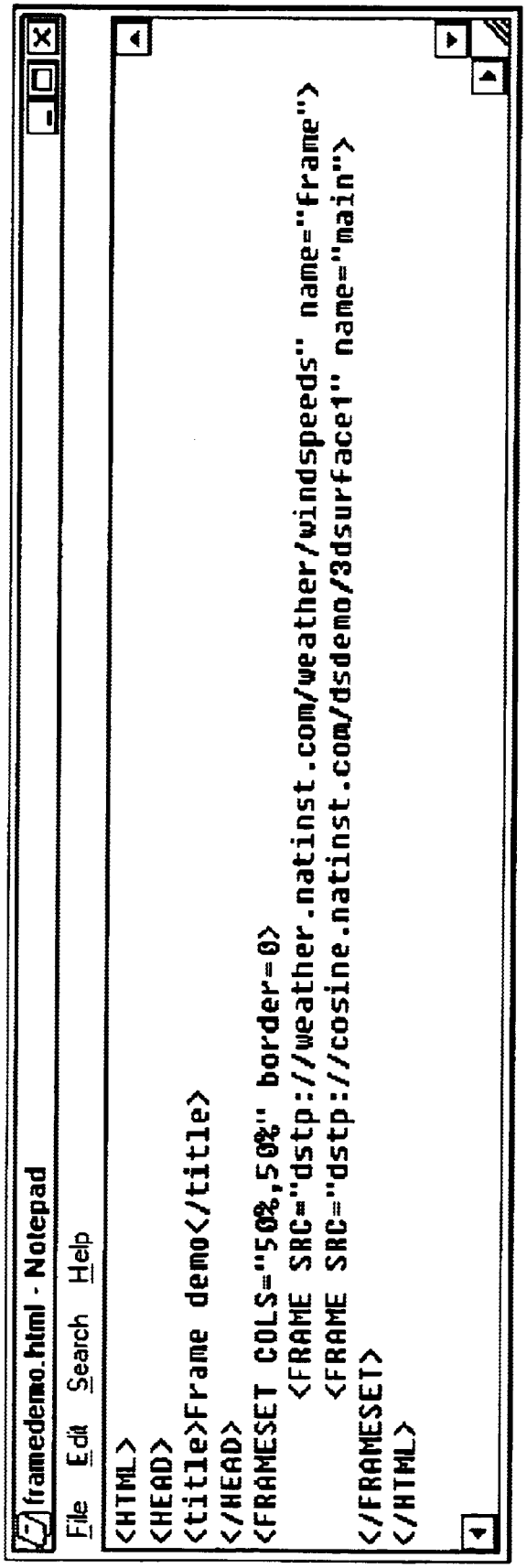
FIG. 8 illustrates an HTML page using data source URLs to display live data from two different data sources in two frames.

FIG. 8: Extensibility and Flexibility

This section notes several aspects of the present system and method which may enable them to be used for many different purposes. As described above, a user may provide any of various types of data source URLs to a user agent, such as a web browser, and have the data from the data source automatically appear in a default view in the user agent. For example, in one embodiment, the data viewer component utilizes a DataSocket control to perform the communication with the data source. As described below, the DataSocket system has an extendable architecture enabling any of various communication protocols to be used.

Also, different protocol handler plug-ins may be utilized to generate markup language code referencing different data viewer components, as desired. Also, a user may choose to replace a data viewer component, e.g., to customize the method used to display data. This may be done without requiring any knowledge on the user's part of how to construct a protocol handler plug-in. For example, the user may write a custom data viewer component and then re-use a key referring to the default data viewer so that the custom data viewer is referred to instead. For example, in an embodiment in which the default data viewer is an ActiveX component, the user may write a custom ActiveX data viewer component and register the component using the globally unique identifier (GUID) of the default data viewer so that the custom data viewer is instantiated in step 306.

Figure 9:
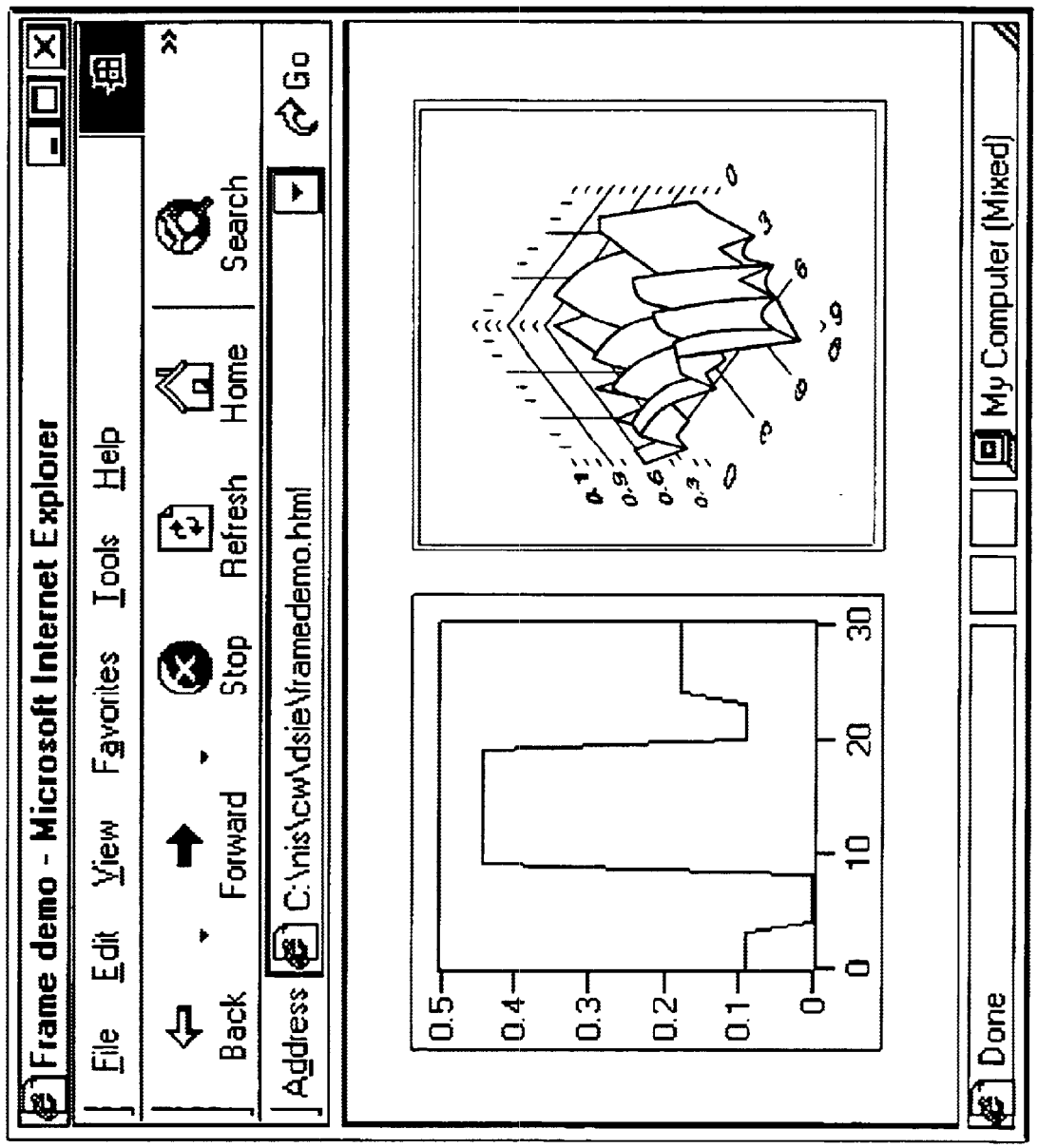
FIG. 9 illustrates a snapshot of the HTML page of FIG. 8 when rendered.

It is noted that, since the protocol handler plug-in handles a data source URL by returning standard HTML to the user agent, data source URLs may be used within HTML pages just as URLs specifying other protocol schemes, such as the HTTP protocol. For example, data source URLs may be referenced in HTML frames, table cells, etc. For example, FIG. 8 illustrates an HTML page using data source URLs to display live data from two different data sources in two HTML frames. FIG. 9 illustrates a snapshot of the HTML page of FIG. 8 when rendered.

Figure 10:
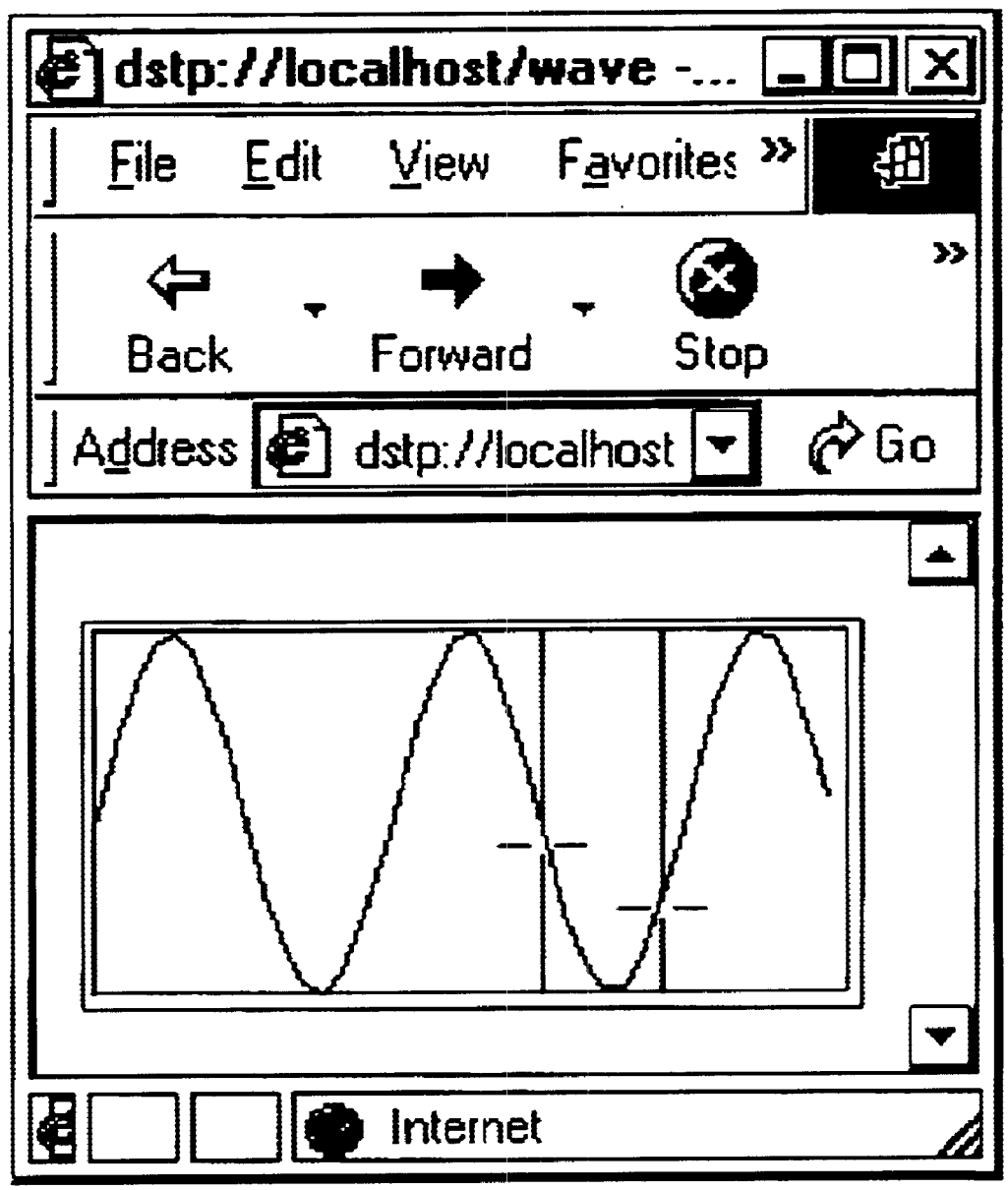
FIG. 10 illustrates a data viewer display comprising interactive elements that a user can manipulate.

As noted above, the data viewer component may provide the ability for the user to interactively change various display settings. FIG. 10 illustrates a data viewer display comprising graph cursors that a user can click on and drag to change the display of the graph. Also, as noted above, the data returned from the data source to the data viewer may comprise attributes specifying various settings that the data viewer should use in displaying the data. For example, in the FIG. 10 display, the data itself may specify that the graph should display movable graph cursors.

It is noted that users may download the plug-in 202 and associated data viewer component 204 using standard plug-in download methods, as appropriate for a particular user agent or platform.

Data Socket Client and FlexData—Sharing Information Across Systems and Applications Data Socket Overview The DataSocket client, also referred to as "DataSocket", comprises a set of tools which simplify the exchange of data and information between an application and a number of different data sources and targets. These sources and target are other entities in the system that data is written to or that data is read from and include other applications, files, HTTP servers, OLE/ActiveX automation servers and more. In many cases these sources and targets may be located on a different machine from the one performing the read and write operations. The term "Data Socket" is an umbrella name for tools in different formats, such as ActiveX controls, java applets, LabVIEW VIs, and CVI instrument drivers, using a common technology for data exchange.

The data format used by Data Socket tools, called Flex Data or FlexData, is enhanced for instrumentation style data and may include attributes in addition to the actual data. Data attributes may include information such as an acquisition rate, test operator name, time stamp, quality of data, etc. The Flex Data data format may be readily adapted for other applications and may include other application-specific attributes, as desired.

Data Socket tools allow users to easily transfer instrumentation style data between different applications, applications and files, as well as different machines. Without such tools, these types of transfer would be done using less specialized tools such as general-purpose file I/O functions, TCP/IP functions, HTTP/HTML transfers combined with CGI programs, etc. With all of these existing technologies, the user is required to perform a significant amount of programming to accomplish his/her tasks. The Data Socket client and tools provide improved functionality and reduce development effort and time.

Data Socket source and targets are addressed using URLs (universal resource locator) that follow the standard URL model. Data Socket supports standard transfer formats including http:, ftp:, and file: and defines additional transfer formats. Data Socket also includes an extension mechanism that allows users to add support for future formats with out modifying existing programs that use the Data Socket Underlying Technologies OLE/ActiveX ActiveX and COM (component object model) are preferably used in much of the underlying architecture of the Data Socket tools including the Data Socket server (DataServer) and data object (CWData ActiveX object).

TCP/IP

TCP/IP (transfer control protocol/Internet protocol) is used to transfer data between the DataServer and different Data Socket clients.

HTTP

HTTP (hyper text transfer protocol) is used to make requests from Data Socket clients to web servers and return the information.

FTP

FTP (file transfer protocol) is used to make requests from Data Socket clients to FTP servers and return information stored in a file.

URL

URLs (universal resource locator) are used to address or identify a Data Socket client's source or target. A URL string starts with its access method, such as http:, which the client uses to determine how to connect to the source or target.

Components

Data Socket Client

The Data Socket client, also referred to as the Data Socket control, is the name used to refer to the component that an application uses to connect to a Data Socket source or target. Data Socket clients have different formats for different development environments. (ActiveX control, LabVIEW VI, CVI instrument driver/DLL, etc.)

Flex Data

Flex Data, also referred to as FlexData, is the format of the underlying data packet that Data Socket tools use to send and store information. These packets are system independent and can be transferred over existing communication technologies such as ActiveX Automation/COM or TCP/IP. The Flex Data data packet has provisions for adding standard and user defined named attributes that are used to further describe the information contained in the packet. For instrumentation-specific functions, information such as a time stamp, test operator name, Unit-Under-Test (UUT) identifier, and more can be added to the data being transferred. Data Socket clients convert data native to an environment and its attributes into Flex Data format or convert Flex Data formatted data back into its native data form. The Flex Data packet is self-describing so no additional information must be exchanged between a client and its source or target.

Data Object

The Data Socket data object (CWData ActiveX object) is used in conjunction with the Data Socket ActiveX control to store data along with all additional attributes.

Data Socket Server

The Data Socket server is a stand-alone process running on a system to facilitate transfer of data between different processes when no other servers are in place. In many cases Data Socket clients exchange information with some other type of server such as a web server, automation server or file server. In cases where a customer desires to directly transfer information between Data Socket clients, the Data Socket server preferably acts as the intermediate data repository. The Data Socket server is dynamically configurable such that any Data Socket can create tags (storage locations) in the Data Socket server. Any Data Socket client can then retrieve the stored information based on the name of the tag.

Implementations

ActiveX control

The Data Socket client functionality is preferably implemented with an ActiveX control and underlying objects. The ActiveX control is preferably optimized for Microsoft Visual Basic/VBA(Visual Basic for Applications)VB Script but is also compatible with other ActiveX control containers including Microsoft Visual C/C++, Borland Delphi, Borland C++ Builder and National Instruments HiQ 4.0. The Data Socket ActiveX control is part of the ComponentWorks tools suite available from National Instruments Corporation and is called CWData Socket. One other significant ActiveX component is the CWData object which stores data transferred by the CWData Socket control.

LabVIEW VIs

LabVIEW/BridgeVIEW VIs implement the same Data Socket client functionality as the ActiveX control in a form native to the G programming syntax.

Instrument Driver

An instrument driver developed in LabWindows/CVI implements the same basic Data Socket client functionality as the ActiveX control. The instrument driver includes function panels for use in the LabWindows/CVI environment and allows creation of a DLL containing a type library. Natively in CVI the instrument driver should also support CVI callback functions to implement Data Socket client events.

Java Bean

One embodiment of the invention comprises a Java bean developed in Java that implements the same basic Data Socket client functionality as the ActiveX control. The bean is written in "Pure Java" and can be run on several different computer platforms.

Additional Components

URL AccessMethod Extensions

The Data Socket client includes built-in support for standard sources such as files, FTP and HTTP. Other built-in support includes exchange with a Data Socket DataServer, using a TCP/IP-based protocol, referred to as Data Socket Transfer Protocol (DSTP), which is described below. Developers are also able to define their own extensions or plug-ins that allow the Data Socket to connect to their own data sources. Extensions are identified by the URL access method. The URL Access is the part of the URL string that precedes the first colon ":". A Data Socket extension is preferably implemented using an automation server written to a common specification. The automation server and unique extension name are registered with the operating system. The Data Socket client uses the automation server when it detects the corresponding access method, which is not supported natively but is registered with the OS. Applications of Data Socket extensions include direct links to OPC servers, external instruments, Data Acquisition (DAQ) devices, databases, multimedia devices, and others.

File Adapter Extensions

The Data Socket clients support certain common file formats such as tab delimited text when performing file I/O operations. As noted above, the user can also create their own file adapters that the Data Socket client will use to read or write files using custom-defined formats. The file name extension or other explicitly stated identifier determines the file format used for a particular operation. File adapters preferably comprise automation servers that are written to a common specification and registered with the operating system.

User Control

Data Socket provides user level tools and utilities to interact and work more easily with Data Socket. A Data Socket user control provides a simple pre-defined user interface for entering a URL, connecting to the source or target, and monitoring the connection status.

Data Browser

Data Browser is a simple utility application that uses a Data Socket client to connect to arbitrary sources and display their data in a suitable form (graphically or text) along with any attributes stored with the data.

Applications

Interactive Web Pages

One use of the Data Socket is the ability to develop interactive web or remote interfaces for applications running on a particular machine. Currently there are tools available, including the LabVIEW and CVI Internet Toolkits, to provide some amount of interaction between a web browser and an application running on a server. However this interaction is very limited in most cases or requires significant amounts of programming using CGI and HTML image maps. The Data Socket tools of the present invention enable a user to very simply build a remote application that can interact with the main application to send updated information or commands back and forth. The Data Socket client, e.g., a Data Socket ActiveX control, also enables a user to simply build such a remote application in a web page and provide a web browser-based interactive interface to a server application. Applications such as running remote experiments or providing web based supervisory control to an automation process become feasible and relatively simple to implement.

Universal Input API for Programming

The Data Socket may thus be used as the primary means to retrieve data into a user's application, thus greatly simplifying the task compared with using traditional I/O mechanisms like file 10. For example, by using the Data Socket to read in waveforms to display in a graph, the user's application is relieved from all tasks related to parsing raw data since the Data Socket returns the Waveform as an easy to use array of numbers. Thus an application can read data from files of many different formats, or from many different sources, such as ftp, http(web), or file servers. An end user can even allow the application to read waveforms from new file formats or new hardware devices by creating a new Data Socket extension.

Broadcast Distribution of Live Data

A data acquisition application can use a Data Socket client or control to write live data to a Data Socket Server that in turns distributes data to other DataSockets that have connected to the server to read data from the server. This method is advantageous over typical current scenarios since the data passed can include attributes that do not interfere with the primary value being sent. This allows the source Data Socket to add new attributes without breaking the Data Socket clients that are reading the data.

The Data Socket can also be used in multimedia applications for live or distributed video, including streaming video applications and multicast video. In this application, the multimedia or video application uses a Data Socket client or control to write live data to a Data Socket Server that in turns distributes data to other Data Sockets that have connected to the server.

Figure 11A:
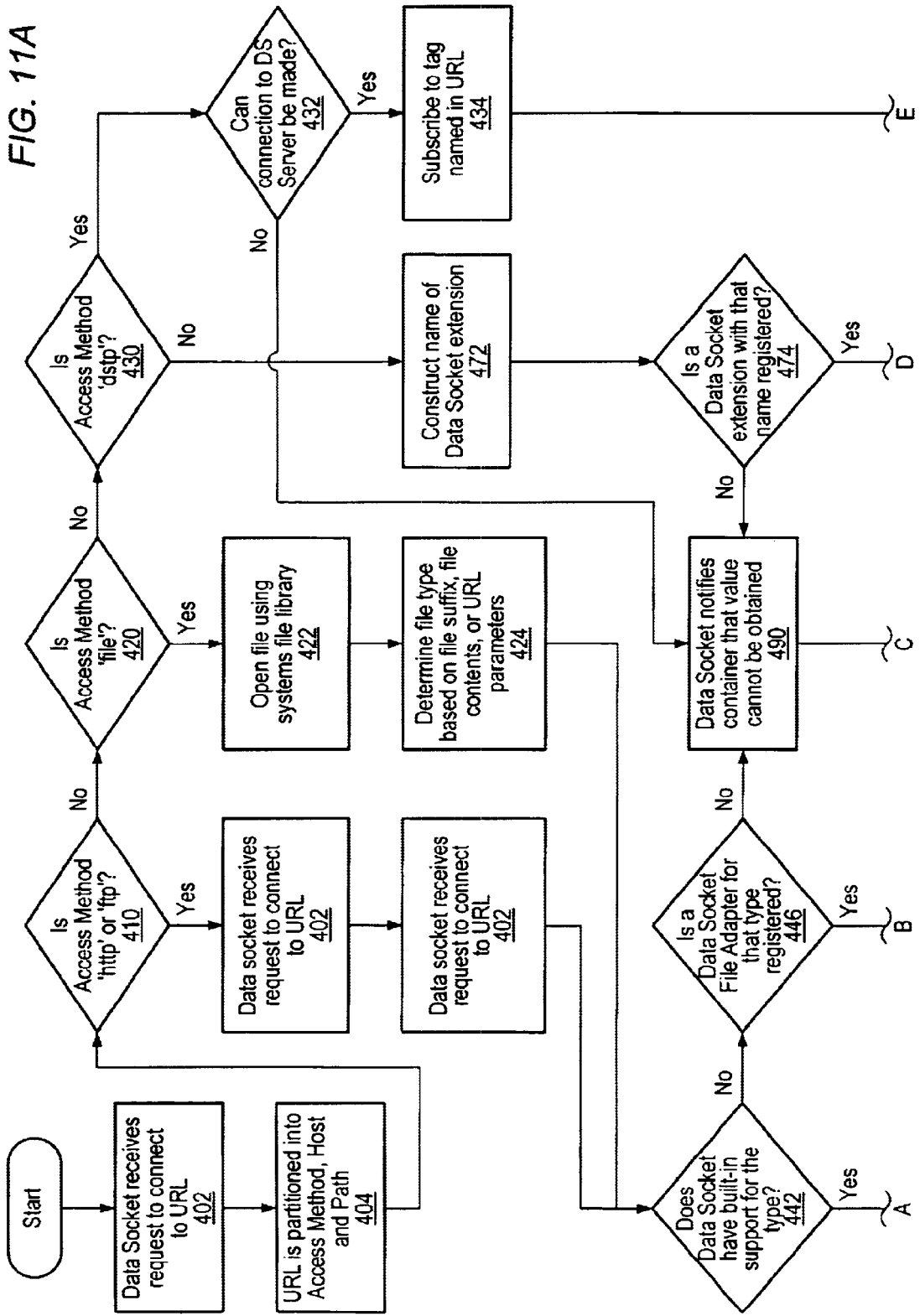
FIGS. 11A–11B comprise a flowchart diagram illustrating the Connect method of a DataSocket.
Figure 11B:
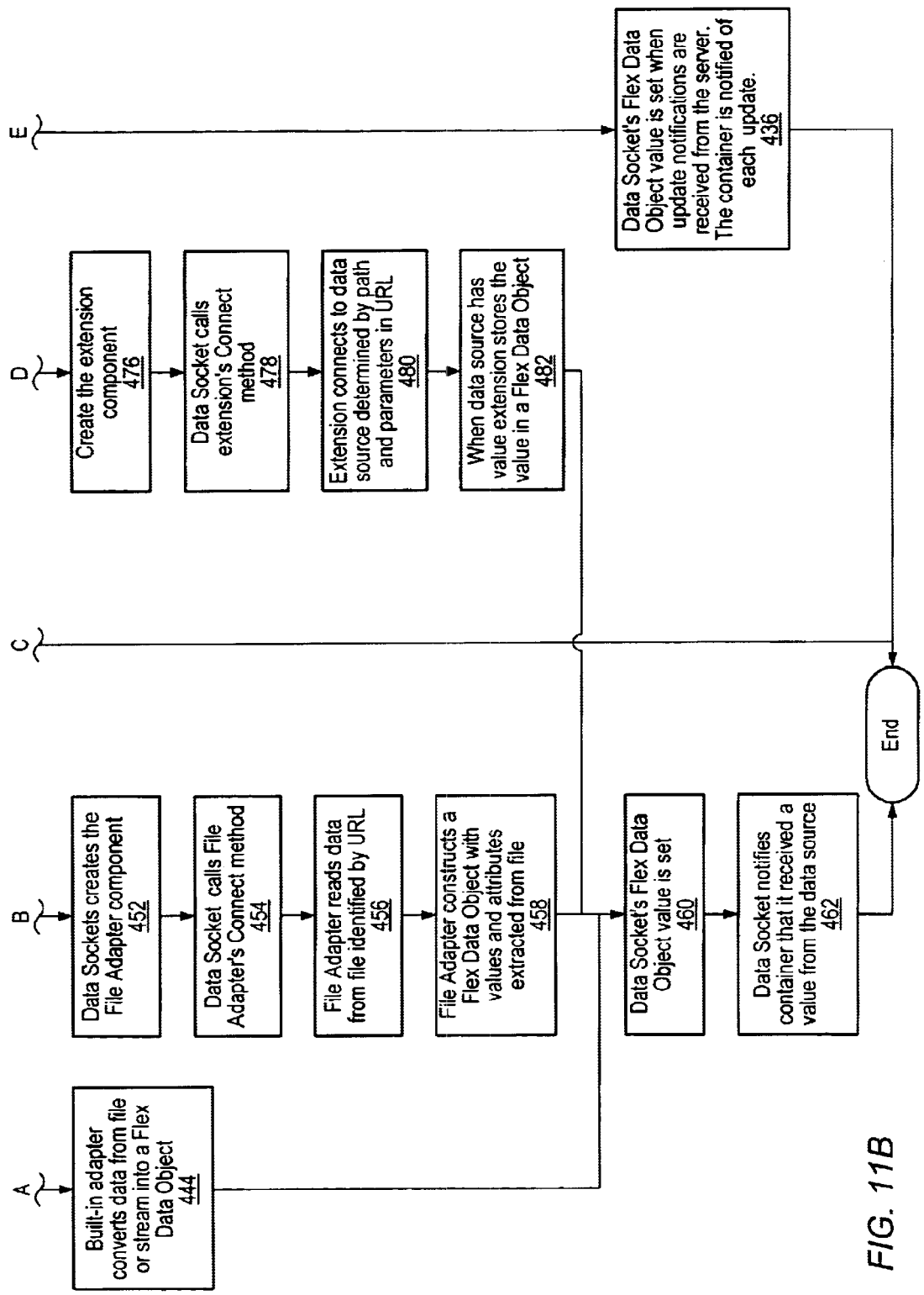

FIGS. 11A–11B: Connect Method Flowchart Diagram

FIGS. 11A–11B comprise a flowchart diagram illustrating the Connect method in the Data Socket client according to the preferred embodiment of the invention. It is noted that various steps in FIGS. 11A–11B may occur concurrently and/or in different orders. Also, FIGS. 11A–11B illustrate the preferred embodiment of the invention. However, it is noted that the system and method of the present invention may be implemented in various ways, as desired.

As shown, in step 402 the Data Socket client receives the request to connect to a resource specified by a URL. For example, a data viewer component may be invoked with a URL parameter as described above for FIG. 5, and the data viewer may then request the Data Socket to connect to the data source specified by the URL.

In step 404 the Data Socket client partitions the URL into an AccessMethod or protocol scheme, Host and Path. The AccessMethod of the URL preferably comprises the first entry in the URL, e.g., either http, ftp, file or dstp, etc. Other AccessMethods are also contemplated. The "Host" portion specifies the host computer where the data is located, and the "Path" specifies the path where the data is located on the host computer.

If the AccessMethod is either http or ftp as determined in step 410, then in step 412 the Data Socket client connects to the http or ftp server using conventional technology, e.g., using conventional Internet technology.

After step 412, in step 414 the Data Socket client determines the file type. The Data Socket client determines the file type for http based on the mime type. The Data Socket client may also determine the file type based on the URL path suffix and/or the stream contents. After step 414, operation proceeds to step 442.

If the access method is "file" as determined in step 420, then in step 422 the Data Socket client opens the file using the system's file library. In step 424 the Data Socket client determines the file type based on the file suffix or the file contents. After step 424, operation advances to step 442.

After the Data Socket client has determined the file type in either of steps 414 or 424, in step 442 the Data Socket client determines if it has built-in support for the type. If the Data Socket client has built-in support for the file type as determined in step 442, then in step 444 the built-in adapter comprised in the Data Socket client converts the data from the file or stream into a Flex Data object, also referred to as a FlexDataObject.

In step 444 the Data Socket client converts the data into a form more usable by a typical programming language or application. Examples of data converted by the Data Socket include WAV files, tabbed text files, DSD files, and text. For example, if the data is retrieved from a spreadsheet, the Data Socket client converts the tab delimited spreadsheet data into a 2D array of numbers, without any tabs or ASCII strings. This 2D array of numbers is not required to be parsed by the containing application. Also, in general, a number of engineering formats exist for storing vectors or arrays. The Data Socket client preferably operates to convert data of these various formats into arrays of data or numbers for direct use by the application. After step 444, operation proceeds to step 460.

In step 460 the Flex Data object value in the Data Socket client is set. This means that the data which was converted into the more usable form in step 444, such as a $2d$ array, is now stored in memory managed by an object that is accessible by the client program. In the current embodiment the client application, e.g. the data viewer component 204, can get a copy value from the Flex Data object by call a method on the Flex Data object named "GetValue". This method preferably returns a copy of the value stored in a VARIANT, a structure defined by Microsoft as part of its ActiveX standard for component software. The Value of attributes can be gotten by calling a method named GetAttribute, or set by calling a method called SetAttribute. A VARIANT structure is used for attributes as well. The VARIANT structure can hold simple data types like numbers or Boolean values and data types that require additional memory for storage such as strings and arrays.

In step 462 the Data Socket client notifies the container or application, e.g. the data viewer component 204, that it has received a value from the URL, preferably through a new data event. Operation then completes.

If the Data Socket client does not include built-in support for the file type as determined in step 442, then in step 446 the Data Socket client determines if a Data Socket file adapter is registered for that type. A Data Socket file adapter is created by a user and registered with the Data Socket. The Data Socket file adapter is used to read or write files using custom-defined formats. If a Data Socket file adapter is not registered for that type, then in step 490 the Data Socket client notifies the container or application that the value cannot be retrieved, and operation completes.

If a Data Socket file adapter is registered for that file type as determined in step 446, then in step 452 the Data Socket creates the file adapter component or client. In step 454 the Data Socket client calls or invokes the file adapter's Connect method. In step 456 the file adapter reads data from the file identified by the URL. In step 458 the file adapter constructs a Flex Data object with values and attributes extracted from the file.

After steps 452–458 have been performed, in step 460 Flex Data object value in the Data Socket client is set, and in step 462 the Data Socket client notifies the container or application that it has received a value from the URL, and operation completes.

If the access method is "dstp" as determined in step 430, then in step 432 the Data Socket client attempts to make a connection to the Data Socket server identified by the URL using the host name or Internet address encoded in the URL according to standard URL syntax. As described above, the access mode "dstp" directs the Data Socket client to connect to the Data Socket server identified in the URL. If the connection is established in step 432, then in step 434 the Data Socket client sends a command indicating a request to subscribe to a specific tag, or to write the value of a specific tag maintained by the Data Socket server. The Data Socket client preferably sends this command over TCP/IP. If the specific tag does not exist on the server, then the server may create the tag and give it an initial value, or may report back an error indicating that that the requested tag does not exist. This is a configuration option on the Data Socket server. Reporting errors is preferably done by sending commands over the TCP/IP connection. Commands are preferably sequences of bytes sent over a TCP/IP connection.

After step 434, as updates are received in step 436, the Data Socket client sets the value in the Data Socket's Flex Data object and notifies the container. Thus, each time update notifications are received from the server, the Flex Data object is set and the container or application, e.g. the data viewer component 204, is notified of each update. Step 436 is continually performed as data is received until the container instructs the Data Socket client to disconnect from the URL to which it is connected.

If the access method is not "dstp" as determined in step 430, and is not either http, ftp, or file as determined in steps 410 and 420, then in step 472 the Data Socket client derives or constructs the name of an extension or plug-in from the access method that was specified in the URL. For example, if the access method is "opc" then the name of the extension or plug-in could be "DataSocketPlugIn_opc".

In step 474 the Data Socket client determines if a Data Socket extension or plug-in with that name is registered. Thus, if the access method is not one of the pre-defined types, e.g., http, ftp, file, or dstp, in steps 472 and 474 the Data Socket client attempts to intelligently determine the proper extension or plug-in from the access method that was specified in the URL.

If no Data Socket plug-in is registered with the derived name, then the Data Socket client notifies the application or container that the value cannot be retrieved in step 490, and operation completes.

If a Data Socket plug-in is registered for the determined extension name as determined in step 474, then steps 476–482 are performed.

In step 476 the Data Socket client creates an extension component based on the registered Data Socket extension. In other words, Data Socket client instantiates a component from the registered Data Socket extension.

In step 478 the Data Socket client calls the extension component's Connect method. In step 480 the extension or plug-in connects to the data source determined by the path and parameters in the URL. In step 482, when the data source has a value, the extension stores the value in a Flex Data object and operation then advances to 460. As discussed above, in steps 460 and 462 the Data Socket client's Flex Data object value is set and the Data Socket client notifies the container that it has received a value from the URL, and operation then completes.

Figure 12:
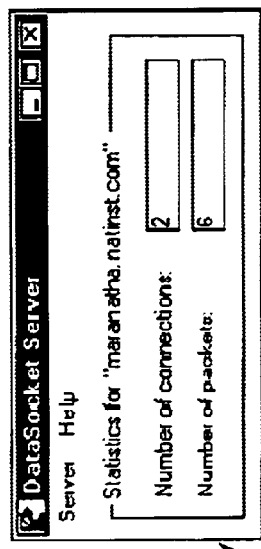
FIGS. 12 and 13 illustrate Data Socket server examples.
Figure 12:
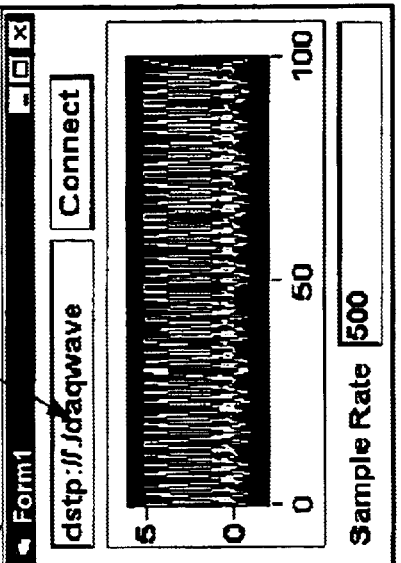
Figure 12:
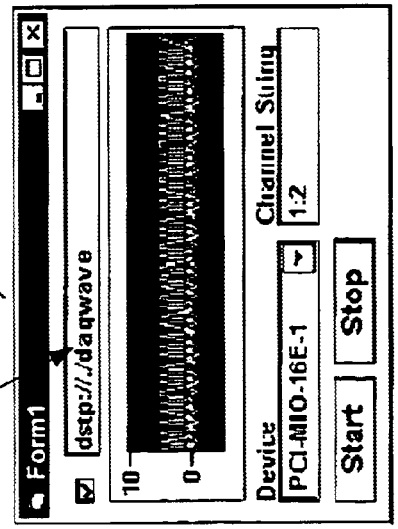

FIG. 12—Data Socket Server Example

FIG. 12 illustrates an example of a Data Socket server. When data is shared between two applications using Data Socket clients or tools, the data is preferably stored in an intermediate data server, referred to as a Data Socket server. The Data Socket server is a separate process (application, executable) running on the same machine as any of the Data Socket clients or on a different machine accessible through a network. Each application connects to the data server using a Data Socket client. The URL for each control identifies the machine on which the server is running and an item name. A Data Socket server can store a number of different data items simultaneously, each identified by a unique item name referred to as a tag. In the preferred embodiment, the data server can be configured for different security levels allowing access to pre-determined list of computers.

In the example of FIG. 12, a first Data Socket client (on the left side of FIG. 12) is configured to write data to the Data Socket server. As shown, the URL identifies the server location where the data is written, in this example to a ComponentWorks Data Socket server (CWDataServer). A second Data Socket client (on the right side of FIG. 12), e.g. a data viewer component 204, is configured to read data from the Data Socket server. As shown, the URL can also identify the server location from which data is read.

FIG. 12 also illustrates the use of data attributes with Data Socket. As shown in FIG. 12, the data received by the receiving Data Socket client includes raw data (the waveform) and one or more attributes, e.g., the sample rate. The data attribute is used to transmit the sampling rate of a waveform, which is necessary, for example, to perform a proper spectrum analysis in the client application.

As mentioned above, Data Socket supports the addition of data attributes with the actual data shared or exchanged. This allows the Data Socket to better handle engineering and scientific data that may require additional information passed with the data. In the preferred embodiment, the data source defines custom data attributes by name and specifies a value for each attribute. These attributes are automatically shared as part of the data with other data targets, such as other applications or a file. The Data Socket server automatically handles attributes when distributing the data item.

The developer defines attributes for the source application. Any of various types or kinds of attributes can be defined. For example, in a test and measurement application, the attribute can be things such as sampling rate, timestamp, quality information, user information, UUT information, and more. Data attributes can be easily read by the data target or client and processed or displayed separately from the data, or be used to process the data.

Figure 13:
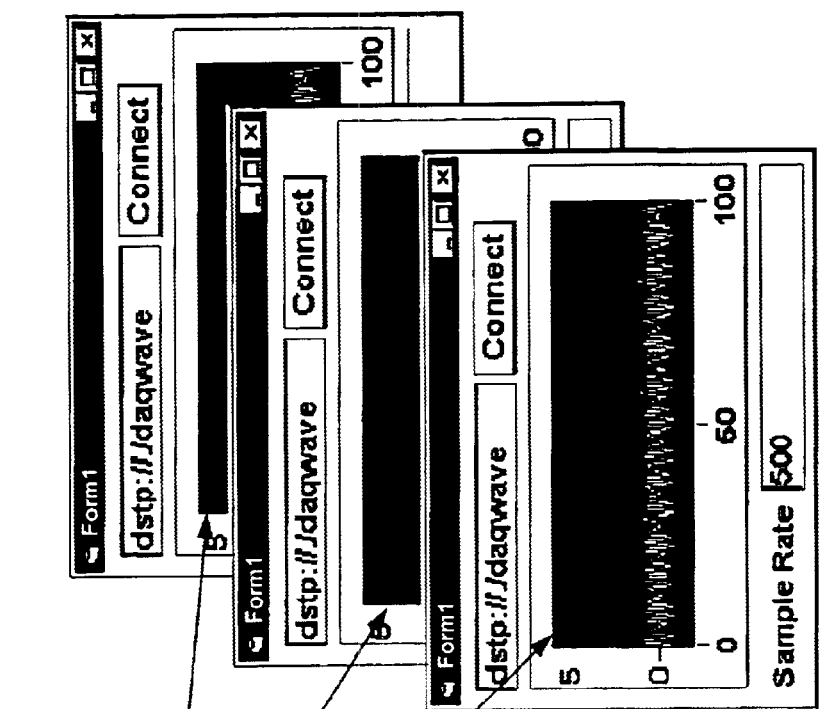
Figure 13:
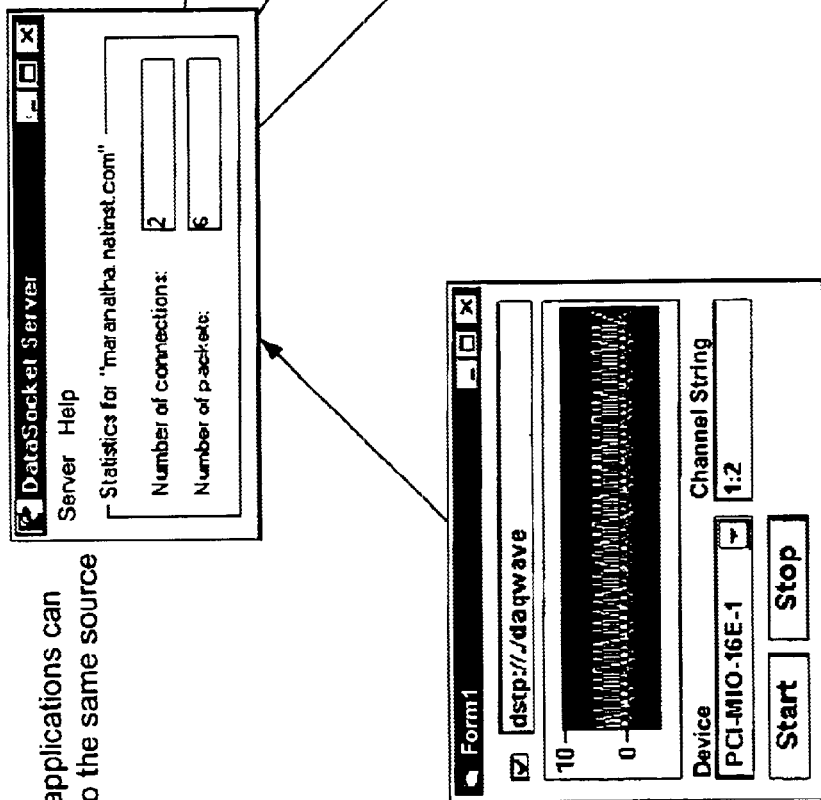

FIG. 13—Data Socket Server Example

FIG. 13 illustrates an example of a Data Socket server receiving data from a single source application and providing the data to a plurality of target applications. In the preferred embodiment, the Data Socket server by default allows multiple read (client) connections to a specific data item, but only one write connection. This is a typical configuration for a post and publish application or broadcast application, in which one application supplies data to a number of different clients.

Using the Data Socket server, the application supplying the data is not required to handle the administrative details of sending data to many different clients, and hence the source application can run more efficiently. The Data Socket server, which can be located on a different machine, assumes the task of redistributing the information. The user can configure the maximum number of data items and maximum number of connections allowed to the server. The user can also configure multiple write connections to a data item at the same time.

Figure 14:
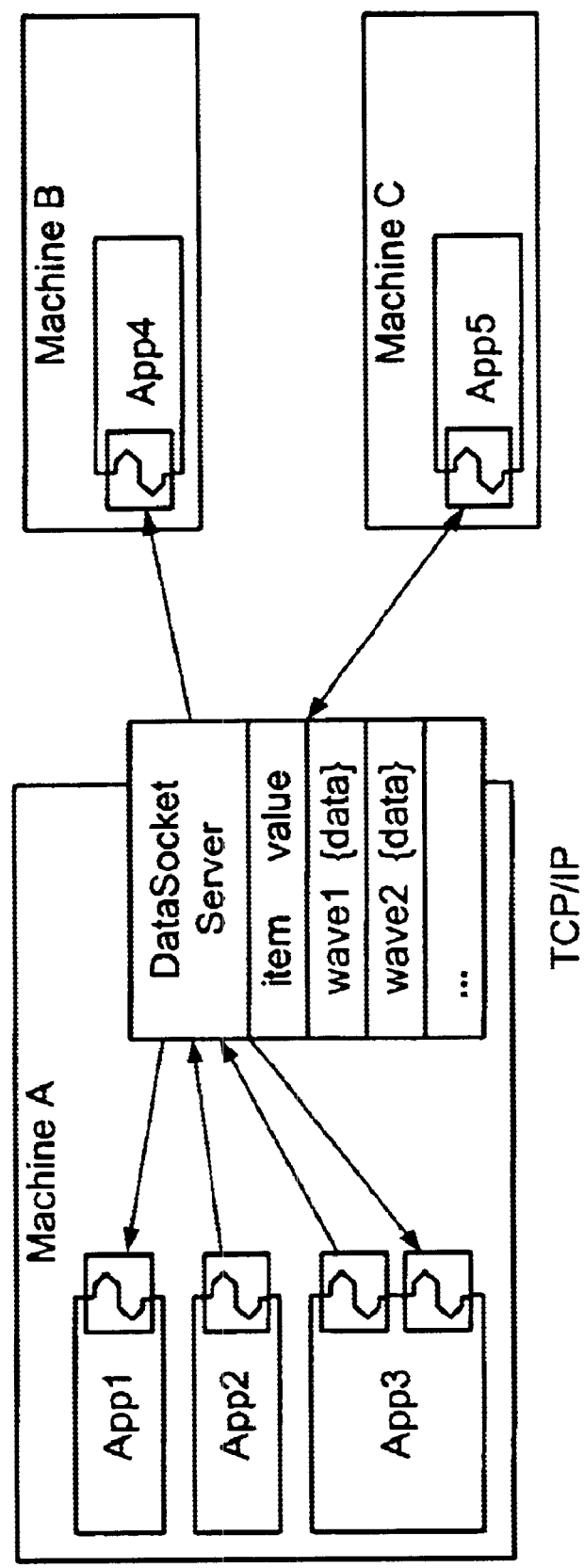
FIG. 14 illustrates the Data Socket Transfer Protocol.

FIG. 14—Data Socket Transfer Protocol

A communication protocol referred to as the Data Socket Transfer Protocol (DSTP) may be used to communicate between the Data Socket tools and the Data Socket server. In the preferred embodiment, the DSTP is based on the industry-standard TCP/IP protocol using a registered user port number 3015. A brief description of the protocol used in the preferred embodiment follows:

Message Formats

All messages are made up of packets of bytes comprising the following parts.
1. [message_length] A 4-byte integer field (in little-endian) describes the length of the entire message in bytes, including the 4-byte header.
2. [message_format] A 2-byte enumeration that describes the binary format of the data in the message_data field. Types include 1,2,4,8 byte integers, 4 & 8 byte floating-point numbers, ASCII and UNICODE strings. There are two special enumeration values. The first, "array", is followed by a nested message whose type field describes the array element type. The second special enumeration value "cluster" is followed by a two byte count and then by series of nested messages each describing one element of data that follows in the message data section.
3. [message_data] Optional data in the format identified by the second field. In the case of arrays and clusters, there may be more than one value.

Message Types

Kinds of Messages

Messages are sent as a block of values stored in the "cluster" format described above. The first element is the op code, subsequent elements are parameters, if necessary, for the specific op code.
1. Greeting exchange, protocol version exchange.
2. Request from client to subscribe to an item maintained by the server. items are identified by a ASCII or UNICODE string.
3. Request from client to server to cancel any existing subscription on an item
4. Request from client to server to get an item's value
5. Request from client to server to set an item's value
6. Notification from server to client of an item's value. This may be in response to a subscription or a specific request for the value.
7. Notification from server to the client that the served is being shut down.
8. Notification from client to server that it is closing the connection. (This implies canceling any subscriptions made on the connection.)ps Message opcodes:
Opcodes used:
 kCWDS_Connect,
 kCWDS_Disconnect,
 kCWDS_SetVersion,
 kCWDS_Logon,
 kCWDS_Subscribe,
 kCWDS_Unsubscribe,
 kCWDS_SetValue,
 kCWDS_GetValue, Message Sequences:
Sequences:
 With the exception of the greeting messages, the client, or server never waits for a reply. Either the client or server can cancel the session at any time by sending the appropriate "disconnect" message.
Protocol functions:
Funcions:
 Getting, setting, and subscribing to values of items stored in a database maintained by a server.

Name of the port:
nati-dstp

Data Socket handles all tasks of converting data and data attributes from their native application format (strings, arrays, Booleans, etc.) into a TCP/IP suitable format, referred to as the Flex Data format, and converting back from the Flex Data format on the client end. Because the DSTP network communication only requires TCP/IP support, the Data Socket can be used to share information through many different types of networks, including the Internet. The Data Socket can be used to share information between machines located on opposite sides of the world using local Internet service providers. Of course, Data Socket and the Data Socket server can be used on a local Windows network or in a single stand-alone computer.

Automatic Generation of Data Source URLs

As described above, the present system and method enable a user to easily connect to and view live data from a data source using a standard, easily available user agent, such as a web browser, without requiring any programming on the user's part. Viewing live data is thus as easy as browsing the web; the user need only provide a URL identifying the data source to the user agent.

However, providing the appropriate URL for a data source may require some knowledge on the user's part, such as the correct syntax to use for the URL. The present system and method may be used together with the system and method disclosed in U.S. patent application Ser. No. 09/374,740, which describes a system and method for automatically generating URLs referencing data sources/targets connected to a computer. This section highlights this automatic URL generation. For more information, please refer to the above-referenced patent application.

This section discusses a system and method to automatically identify the data sources and targets, e.g., hardware device I/O sources or targets, connected to a computer system and generate URLs for configuring and accessing them. The terms "data source" and "data target" are used in a broad sense to refer to any of various types of data sources/sinks that can be read from and/or written to, such as files, http servers, I/O devices, etc. The URLs generated may be integrated with the computer operating system so that a user may easily access them and provide them to an application program. For example, in one embodiment, a user may provide a generated URL to a user agent 200, such as a web browser enabled with a protocol handler plug-in 202 and data viewer component 204 as described above. The data viewer may include a Data Socket control which then accesses the data source identified by the URL and returns data from that source to the user agent.

The preferred embodiment for automatically generating the URLs comprises a software module referred to herein as the URL generation manager which manages the process of identifying data sources/targets connected to the computer system and generating URLs for each of them. The embodiment may further comprise plug-in modules for each type of data source/target which each communicate with the URL generation manager. For example, one plug-in module may be associated with DAQ devices, another may be associated with GPIB devices, and another may be associated with files or a particular type of file. The URL generation manager instructs each plug-in module to perform a process of identifying all the addressable data sources/targets associated with the plug-in type and generating a separate URL for each one. For example, for a system containing two DAQ boards with eight channels each, the DAQ plug-in module may generate sixteen separate URLs, one for each channel. Each of the plug-in modules may query a hardware database or other type of database, as appropriate to the plug-in type, to determine information regarding the data sources/targets, such as capabilities and configuration information. This information is then used in generating the URLs. The URL generation manager may then integrate the URLs generated by each plug-in with the computer operating system or with application programs. For example, in one embodiment, the URLs are integrated into the "Favorites" or "Bookmarks" list of a web browser.

In the above description, the URL generation process involves generating a URL for each addressable data source or target connected to the computer. However, the process may also generate URLs for only a subset of the addressable data sources/targets. For example, in response to a new device being connected to the computer, it is possible that only the URLs for the data sources/targets of the new device are generated. Also, a user may specify a subset of the addressable data sources/targets for which to generate URLs.

The URL generation process may be initiated at system boot, or in response to a new device being connected to the computer, or in response to a user request, or in response to some other event or condition. For the case of hardware device data sources/targets, the URL generation manager is notified by the operating system of either all of, or a subset of, the connected devices, as appropriate to the situation triggering the URL generation process. In the preferred embodiment, this notification is accomplished by integrating the URL generation manager with the Plug & Play system of the operating system. For example, the Plug & Play system may notify the URL generation manager of a new device that has been connected to the computer, or the Plug & Play system may notify the URL generation manager of all the connected devices at system boot time. After such notification, the URL generation manager then initiates and manages the process of identifying the capabilities of the device(s) and generating URLs for the addressable data sources/targets of the device(s).

It is noted that the plug-ins responsible for generating URLs for the data sources/targets may include configuration information in the URLs that they generate. Thus, device configuration and software configuration capabilities are inherent. Utilities for editing the generated URLs or creating new URLs with different configuration information may also be provided. These utilities would allow the user to change the configuration information contained in a URL without necessarily knowing the required syntax.

In the preferred embodiment, the URLs generated are used in conjunction with the Data Socket system disclosed in U.S. patent application Ser. No. 09/185,161. As noted above, the Data Socket system performs all the work necessary to read from a data source or write to a data target identified by a URL, including the connection process, data conversion, etc.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A method for displaying live measurement data from a measurement device, the method comprising:

providing a URL to a user agent, wherein the URL references the measurement device;

connecting to the measurement device specified by the URL;

the measurement device generating live measurement data representing a physical phenomenon;

the measurement device providing the live measurement data in response to said connecting to the measurement device;

receiving the live measurement data from the measurement device after said connecting to the measurement device; and displaying the received live measurement data.

2. The method of claim 1, wherein the URL specifies a protocol scheme, the method further comprising:

determining an appropriate component for performing said connecting to the measurement device specified by the URL using the protocol scheme.

3. The method of claim 1, further comprising:

determining an appropriate protocol handler to process the URL using the protocol scheme; and the protocol handler processing the URL, wherein said processing comprises specifying a data viewer to perform said connecting to the measurement device.

4. The method of claim 3, wherein said protocol handler specifying a data viewer comprises the protocol handler generating markup language code identifying a data viewer;

wherein the method further comprises:

the user agent receiving the markup language code;

the user agent processing the markup language code; and the user agent instantiating the data viewer identified by the markup language code, in response to said processing the markup language code.

5. The method of claim 3, further comprising:

the data viewer performing said connecting to the measurement device specified by the URL;

the data viewer performing said receiving the live measurement data from the measurement device after said connecting to the measurement device; and the data viewer performing said displaying the received live measurement data.

6. The method of claim 3, wherein the protocol handler is a plug-in component constructed according to a plug-in framework supported by the user agent.

7. The method of claim 1, further comprising:

configuring the measurement device to begin generating the live measurement data after said connecting;

wherein the measurement device generates the measurement data after said configuring.

8. The method of claim 7, wherein said configuring the measurement device includes loading one or more software drivers to initiate the measurement device.

9. The method of claim 1, further comprising:
instantiating a data viewer to perform said displaying the received live measurement data.

10. The method of claim 1,
wherein the URL references a channel of a data acquisition device.

11. The method of claim 1,
wherein the URL references a signal to be acquired by the measurement device.

12. The method of claim 1,
wherein said connecting to the measurement device specified by the URL does not include connecting to a web server.

13. The method of claim 1,
wherein said connecting to the measurement device specified by the URL does not utilize a standard web server protocol.

14. The method of claim 1, wherein said displaying the received live measurement data includes:
examining the received live measurement data;
determining a display method based on the received live measurement data;
using the determined display method to display the received live measurement data.

15. The method of claim 14,
wherein the received live measurement data is a waveform;
wherein the received live measurement data is displayed in a graph.

16. The method of claim 1,
wherein the method operates in a computer system;
wherein the measurement device is comprised in the computer system.

17. The method of claim 1,
wherein the method operates in a computer system coupled to a network;
wherein the measurement device is coupled to the network.

18. The method of claim 1,
wherein the live measurement data comprises data acquired in real time from a physical system.

19. The method of claim 1, further comprising:
the measurement device measuring a unit under test after said connecting;
wherein the measurement device generates the live measurement data in response to the measurement device measuring the unit under test.

20. The method of claim 1,
wherein the user agent is a web browser application.

21. The method of claim 1,
wherein the user agent is an application including web-browsing functionality.

22. A system for displaying live measurement data, the system comprising:
a processor;
a memory medium coupled to the processor;
a user agent stored in the memory medium;
a measurement device;
wherein the user agent is operable to receive a URL referencing the measurement device;
wherein, in response to said user agent receiving the URL referencing the measurement device, the user agent is operable to invoke program instructions stored in the memory medium, wherein said program instructions are executable to connect to the measurement device specified by the URL;
wherein the measurement device is operable to generate live measurement data representing a physical phenomenon;
wherein, in response to said connecting to the measurement device, the measurement device is operable to provide the live measurement data;
wherein the program instructions are further executable to implement:
receiving the live measurement data from the measurement device after said connecting to the measurement device; and
displaying the received live measurement data.

23. The system of claim 22,
wherein the URL specifies a protocol scheme;
wherein the user agent is operable to use the protocol scheme to determine an appropriate component for connecting to the measurement device specified by the URL;
wherein said user agent invoking program instructions comprises executing the component.

24. The system of claim 22, further comprising:
a protocol handler;
a data viewer;
wherein the user agent is operable to use the protocol scheme to determine the protocol handler to process the URL;
wherein said user agent invoking program instructions comprises the user agent calling the protocol handler;
wherein the protocol handler is operable to process the URL, wherein said processing comprises specifying the data viewer to perform said connecting to the measurement device.

25. The system of claim 24,
wherein said protocol handler specifying the data viewer comprises the protocol handler generating markup language code identifying the data viewer;
wherein the user agent is operable to receive and process the markup language code;
wherein, in response to said user agent processing the markup language code, the user agent is operable to instantiate the data viewer identified by the markup language code.

26. The system of claim 24,
wherein the data viewer is operable to receive the live measurement data from the measurement device after said connecting to the measurement device; and
wherein the data viewer is operable to display the received live measurement data.

27. The system of claim 24,
wherein the protocol handler is a plug-in component constructed according to a plug-in framework supported by the user agent.

28. The system of claim 22,
wherein the program instructions are further executable to implement:
configuring the measurement device to begin generating the live measurement data after said connecting;
wherein the measurement device generates the live measurement data after said configuring.

29. The system of claim 28,
wherein said configuring the measurement device includes loading one or more software drivers to initiate the measurement device.

30. The system of claim 22, wherein the program instructions are further executable to implement:
instantiating a data viewer to perform said displaying the received live measurement data.

31. The system of claim 22,
wherein the URL references a channel of a data acquisition device.

32. The system of claim 22,
wherein the URL references a signal to be acquired by the measurement device.

33. The system of claim 22,
wherein said connecting to the measurement device specified by the URL does not include connecting to a web server.

34. The system of claim 22,
wherein said connecting to the measurement device specified by the URL does not utilize a standard web server protocol.

35. The system of claim 22, wherein said displaying the received measurement data includes:
examining the received live measurement data;
determining a display method based on the received live measurement data;
using the determined display method to display the received live measurement data.

36. The system of claim 35,
wherein the received live measurement data is a waveform;
wherein the received live measurement data is displayed in a graph visible on a user interface of the user agent.

37. The system of claim 22,
wherein the processor and the memory medium are comprised in a computer system;
wherein the measurement device is comprised in the computer system.

38. The system of claim 22,
wherein the processor and the memory medium are comprised in a computer system coupled to a network;
wherein the measurement device is coupled to the network.

39. The system of claim 22,
wherein the live measurement data comprises data acquired in real time from a physical system.

40. The system of claim 22,
wherein the measurement device is operable to measure a unit under test after said connecting;
wherein the measurement device generates the live measurement data in response to said measurement device measuring the unit under test.

41. The system of claim 22,
wherein the user agent is a web browser application.

42. The system of claim 22,
wherein the user agent is an application including web-browsing functionality.

43. A system for displaying live measurement data, the system comprising:
a processor;
a memory medium coupled to the processor, wherein the memory medium stores a user agent for obtaining files stored on a network, wherein the memory medium also stores a data viewer for displaying received live measurement data;
wherein the user agent is operable to receive a URL which references a measurement device, wherein the URL also references a protocol scheme for display of live measurement data;
wherein the user agent is operable to:
instantiate the data viewer using the protocol scheme referenced in the URL;
wherein the data viewer is operable to:
connect to the measurement device specified by the URL;
receive the live measurement data from the measurement device and display the received live measurement data.

44. The system of claim 43,
wherein the measurement device measures a unit under test and generates the live measurement data after the data viewer connects to the measurement device.

45. The system of claim 43,
wherein the data viewer is further operable to configure the measurement device to begin generating the live measurement data after connecting to the measurement device;
wherein the measurement device generates the live measurement data after the data viewer configures the measurement device to begin generating the live measurement data.

46. The system of claim 43, wherein the data viewer is operable to:
examine the received live measurement data; and
determine a display method based on the received live measurement data;
wherein the data viewer displays the received live measurement data using the determined display method.

47. The system of claim 43, wherein the memory medium also stores a protocol handler for handling a protocol scheme for display of live measurement data;
wherein the user agent is operable to provide the URL to the protocol handler plug-in;
wherein the protocol handler is operable to:
instantiate the data viewer based on the protocol scheme referenced in the URL.

48. The system of claim 47,
wherein the protocol handler is further operable to generate markup language data in response to receiving the URL;
wherein the markup language data references the data viewer.

49. The system of claim 43,
wherein the live measurement data comprises data acquired in real time from a physical system.

50. The system of claim 43,
wherein the user agent is an application including web-browsing functionality.

51. The system of claim 43,
wherein the URL references a protocol scheme not included in default protocol schemes supported by the user agent.

52. A system for displaying live measurement data, the system comprising:
  a computer system, comprising:
    a CPU; and
    a memory medium coupled to the CPU, wherein the memory medium stores a user agent for obtaining files stored on a network, wherein the memory medium further stores a data viewer for displaying received live measurement data; and
  a measurement device coupled to the computer system;
  wherein the user agent is operable to receive a URL which references the measurement device, wherein the URL also references a protocol scheme for display of live measurement data;
  wherein the user agent is operable to:
    instantiate the data viewer based on the protocol scheme referenced in the URL;
  wherein the data viewer is operable to connect to the measurement device specified by the URL;
  wherein the measurement device is operable to generate the live measurement data after the user agent connects to the measurement device;
  wherein the data viewer is operable to receive the live measurement data from the measurement device and display the received live measurement data.

53. The system of claim 52,
  wherein the data viewer is operable to configure the measurement device to begin generating the live measurement data after connecting to the measurement device; and
  wherein the measurement device generates the live measurement data after being configured.

54. The system of claim 52,
  wherein the measurement device is operable to measure a unit under test after the user agent connects to the measurement device;
  wherein the measurement device generates the live measurement data in response to the measurement device measuring the unit under test.

55. The system of claim 52,
  wherein the live measurement data comprises data acquired in real time from a physical system.

56. The system of claim 52,
  wherein the memory medium also stores a protocol handler for handling the protocol scheme for display of live measurement data;
  wherein the user agent is operable to provide the URL to the protocol handler;
  wherein the protocol handler is operable to:
    instantiate the data viewer using the protocol scheme referenced in the URL.

57. The system of claim 52,
  wherein the computer system is coupled to a network;
  wherein the measurement device is coupled to the network.

58. A method for viewing live data in a system, the method comprising:
  providing a URL to a user agent, wherein the URL references a protocol scheme for viewing the live data;
  instantiating a data viewer using the protocol scheme referenced in the URL;
  connecting to the data source specified by the URL;
  the data source generating the live data after said connecting;
  the data viewer receiving the live data from the data source after said connecting to the data source;
  the data viewer displaying the received live data.

59. The method of claim 58, further comprising:
  configuring the data source to begin generating the live data after said connecting; and
  wherein the data source generating the live data comprises the data source acquiring the live data and providing the live data after said configuring.

60. The method of claim 59,
  wherein said configuring the data source includes loading one or more software drivers to initiate the data source.

61. The method of claim 58, further comprising:
  the user agent providing the URL to a protocol handler for handling;
  wherein the protocol handler instantiates the data viewer based on the protocol scheme referenced in the URL;
  wherein the data viewer connects to the data source specified by the URL.

62. The method of claim 61,
  wherein the protocol handler plug-in instantiating the data viewer includes the protocol handler plug-in generating markup language data in response to receiving the URL;
  wherein the markup language data references the data viewer.

63. The method of claim 61, further comprising:
  the data viewer configuring the data source to begin generating the live data after said connecting; and
  the data source generating the live data in response to said configuring.

64. The method of claim 58,
  wherein the data viewer connects to the data source specified by the URL without connecting to a web server.

65. The method of claim 58,
  wherein the data viewer connects to the data source specified by the URL without utilizing standard web server protocols.

66. The method of claim 58, wherein the data viewer displaying the received live data includes:
  the data viewer examining the received live data; and
  the data viewer determining a display method based on the received live data;
  the data viewer displaying the received live data using the determined display method.

67. The method of claim 58,
  wherein the method operates in a computer system;
  wherein the data source is comprised in the computer system.

68. The method of claim 58,
  wherein the method operates in a computer system coupled to a network;
  wherein the data source is coupled to the network.

69. The method of claim 58,
  wherein the live data is measurement data.

70. A method for viewing live data in a network system, the method comprising:
  a user agent receiving a URL, wherein the URL references a protocol scheme for viewing the live data;
  the user agent providing the URL to a protocol handler for handling;
  the protocol handler instantiating a data viewer using the protocol scheme referenced in the URL;

the data viewer connecting to the data source specified by the URL;

the data source generating the live data after said connecting;

the data viewer receiving the live data from the data source after said connecting to the data source; and the data viewer displaying the received live data.

71. A system for displaying live data, the system comprising:

a CPU;

a memory medium coupled to the CPU, wherein the memory medium stores a user agent for obtaining files stored on a network, wherein the memory medium also stores a data viewer for displaying received live data;

wherein the user agent is operable to receive a URL which references a data source, wherein the URL also references a protocol scheme for display of live data;

wherein the user agent is operable to:
  instantiate the data viewer based on the protocol scheme referenced in the URL; and
  connect to the data source specified by the URL;

wherein the data viewer is operable to receive the live data from the data source and display the received live data.

72. A method for viewing live data from the context of a user agent, the method comprising:

providing a URL to the user agent, wherein the URL comprises a protocol scheme not included in default protocol schemes supported by the user agent;

the user agent delegating the URL to a protocol handler plug-in for handling;

the protocol handler plug-in generating HTML code in response to receiving the URL, wherein the HTML code references a data viewer component;

the user agent instantiating the data viewer component referenced in the HTML;

the data viewer component connecting to the data source specified by the URL;

the data viewer component receiving live data from the data source;

the data viewer component displaying the received live data in a user interface of the user agent.

73. The method of claim 72, wherein the user agent is a web browser application.

74. A memory medium comprising program instructions executable to:

receive a URL, wherein the URL references a measurement device;

connect to the measurement device specified by the URL;

wherein the measurement device is operable to provide live measurement data in response to said connecting to the measurement device;

wherein the program instructions are further executable to:
  receive the live measurement data from the measurement device after said connecting to the measurement device; and
  display the received live measurement data.

75. A memory medium comprising program instructions executable to:

receive a URL, wherein the URL references a protocol scheme for viewing live data;

instantiate a data viewer using the protocol scheme referenced in the URL;

connect to the data source specified by the URL;

wherein the data source is operable to generate the live data after said connecting;

wherein the data viewer is operable to receive the live data from the data source;

wherein the data viewer is operable to display the received live data.

* * * * *